US009019203B2

United States Patent
Asuke et al.

(10) Patent No.: US 9,019,203 B2
(45) Date of Patent: Apr. 28, 2015

(54) STORAGE MEDIUM, INFORMATION PROCESSING APPARATUS, INFORMATION PROCESSING SYSTEM AND INFORMATION PROCESSING METHOD

(71) Applicant: Nintendo Co., Ltd., Kyoto (JP)

(72) Inventors: Shigeyuki Asuke, Kyoto (JP); Masataka Takemoto, Kyoto (JP); Daiki Iwamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 183 days.

(21) Appl. No.: 13/848,555

(22) Filed: Mar. 21, 2013

(65) Prior Publication Data

US 2014/0125576 A1    May 8, 2014

(30) Foreign Application Priority Data

Nov. 5, 2012    (JP) .................................. 2012-243769

(51) Int. Cl.
*G09G 5/00* (2006.01)
*A63F 13/525* (2014.01)
*A63F 13/26* (2014.01)
*A63F 13/92* (2014.01)
*A63F 13/5375* (2014.01)

(52) U.S. Cl.
CPC ............... *A63F 13/525* (2014.09); *A63F 13/26* (2014.09); *A63F 13/92* (2014.09); *A63F 13/5375* (2014.09)

(58) Field of Classification Search
CPC ....... G06F 3/017; G06F 3/016; G06F 3/0416; A63F 13/10; A63F 13/31; A63F 13/2145
USPC ............ 345/156–169; 455/556.1, 556.2, 566; 463/1, 30–44
See application file for complete search history.

(56) References Cited

U.S. PATENT DOCUMENTS

| 2006/0038833 A1* | 2/2006 | Mallinson et al. ............. 345/633 |
| 2009/0076791 A1* | 3/2009 | Rhoades et al. ................. 703/21 |
| 2011/0111851 A1 | 5/2011 | Hayashida et al. |
| 2012/0276998 A1* | 11/2012 | Zhu et al. ........................ 463/31 |

FOREIGN PATENT DOCUMENTS

JP    2011-101754    5/2011

* cited by examiner

*Primary Examiner* — Jennifer Nguyen
(74) *Attorney, Agent, or Firm* — Nixon & Vanderhye, P.C.

(57) ABSTRACT

A non-limiting example game system includes a game apparatus to which a television functioning as a stationary-type display device is connected. The game apparatus performs game processing basically according to operation data from a controller. An input terminal device functioning as a portable-type display device is kept at a user's hand, for example. A course selecting screen is displayed on a screen of the television and an information presenting screen corresponding to the course selecting screen is displayed on a screen of the input terminal device. In the information presenting screen, a comment input by another user is displayed near a course mark, and a designating object which designates the presence of the comment is displayed at a corresponding position in the course selecting screen.

21 Claims, 17 Drawing Sheets

FIG. 4
(A) COURSE SELECTING SCREEN 100
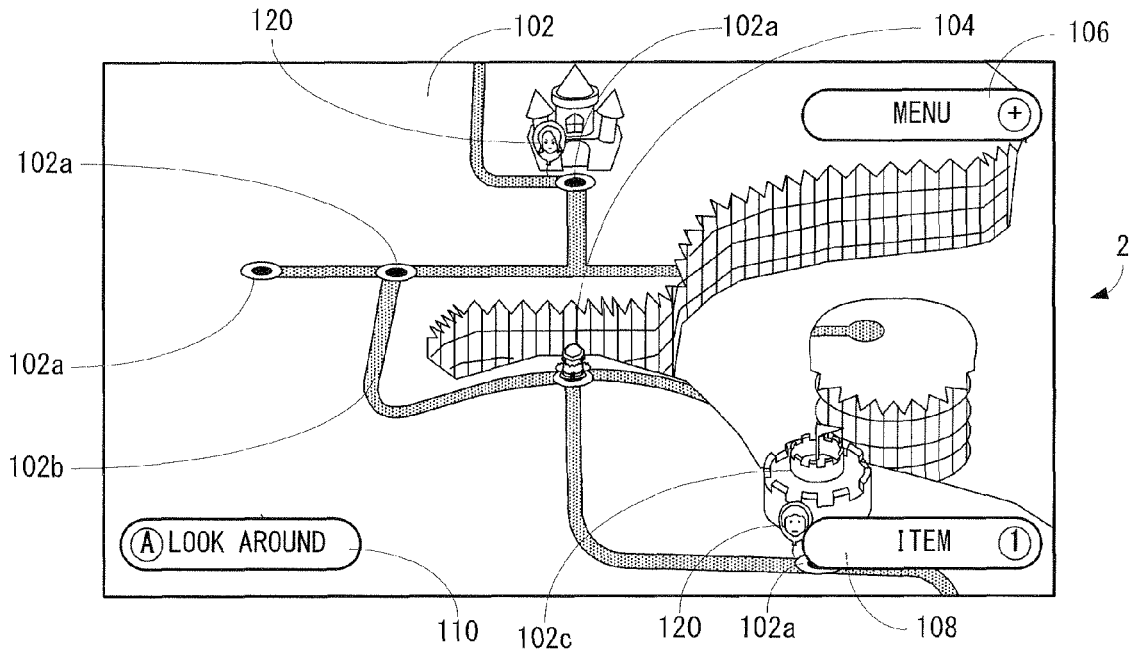
(B) INFORMATION PRESENTING SCREEN 200
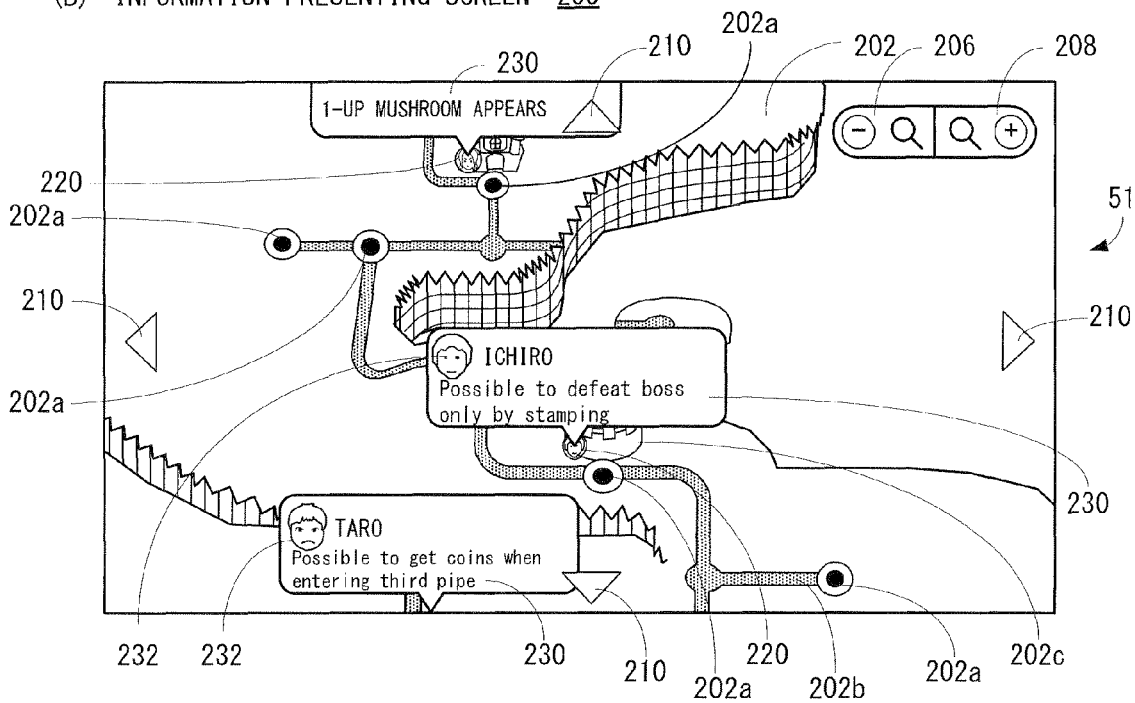

FIG. 6
DISPLAYING RANGES OF TELEVISION GAME IMAGE AND TERMINAL GAME IMAGE
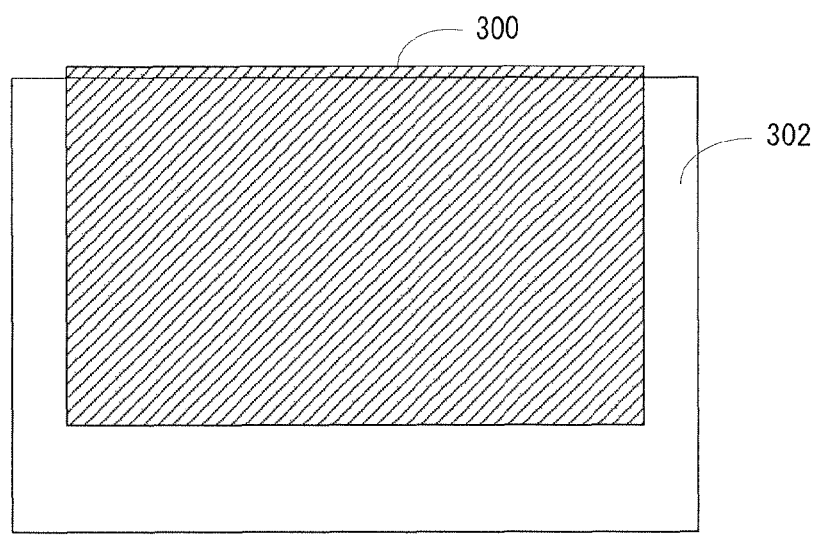
WORLD COORDINATE SYSTEM
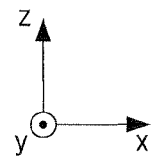

FIG. 7
(A) COURSE SELECTING SCREEN 100
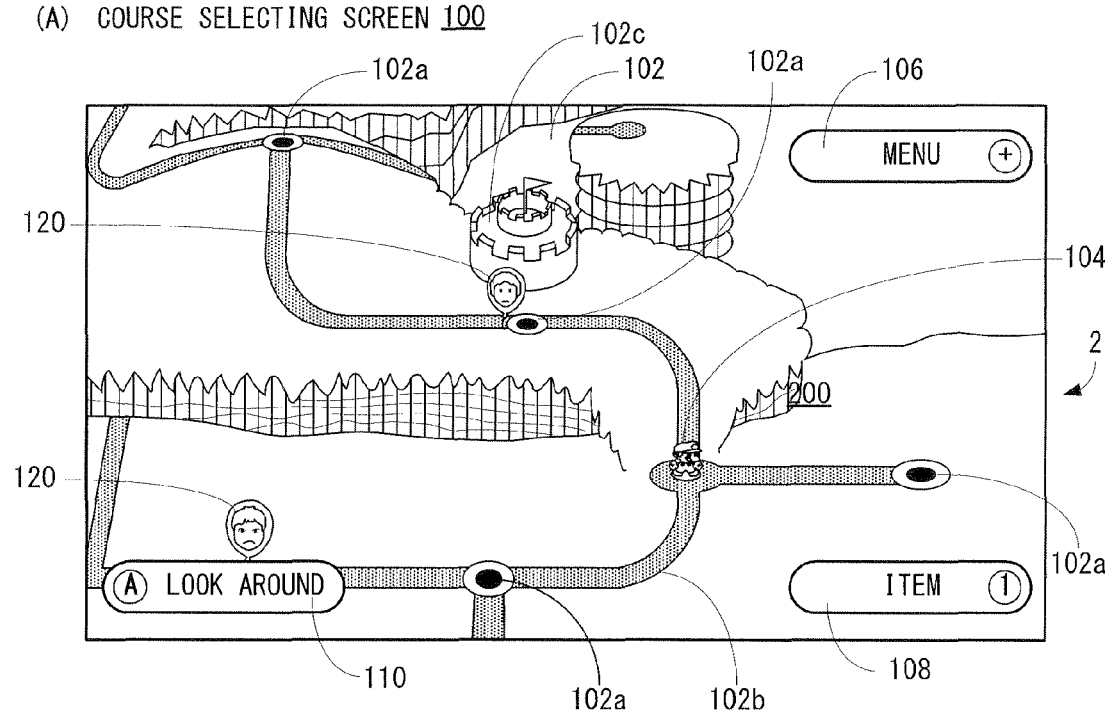
(B) INFORMATION PRESENTING SCREEN 200
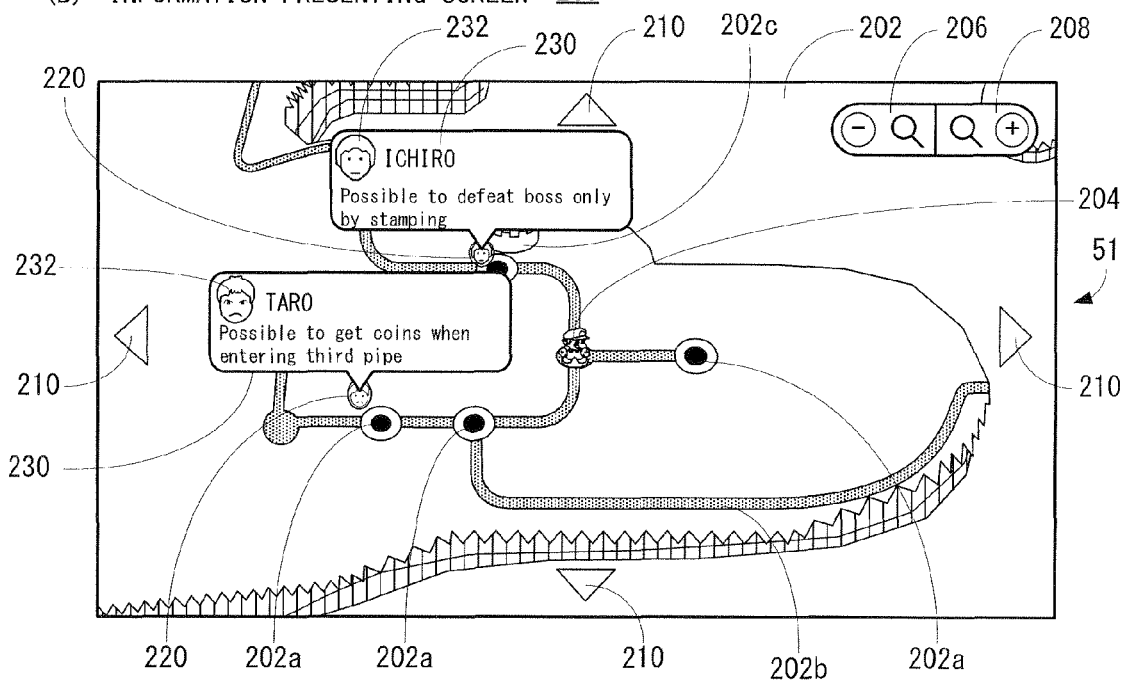

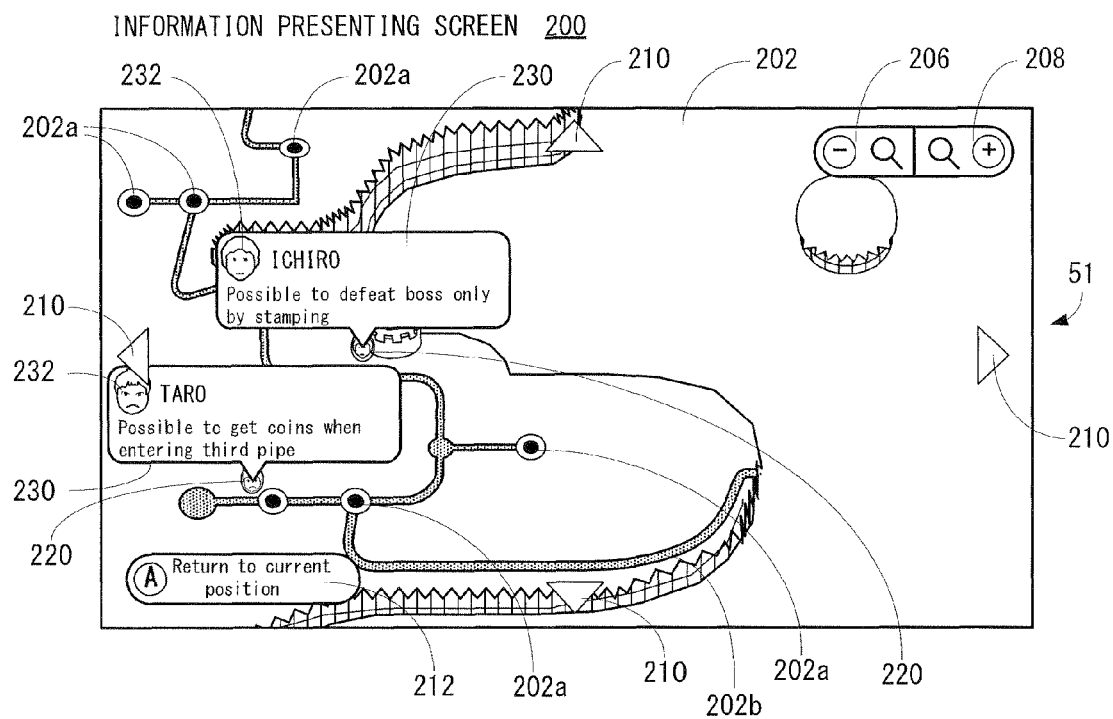
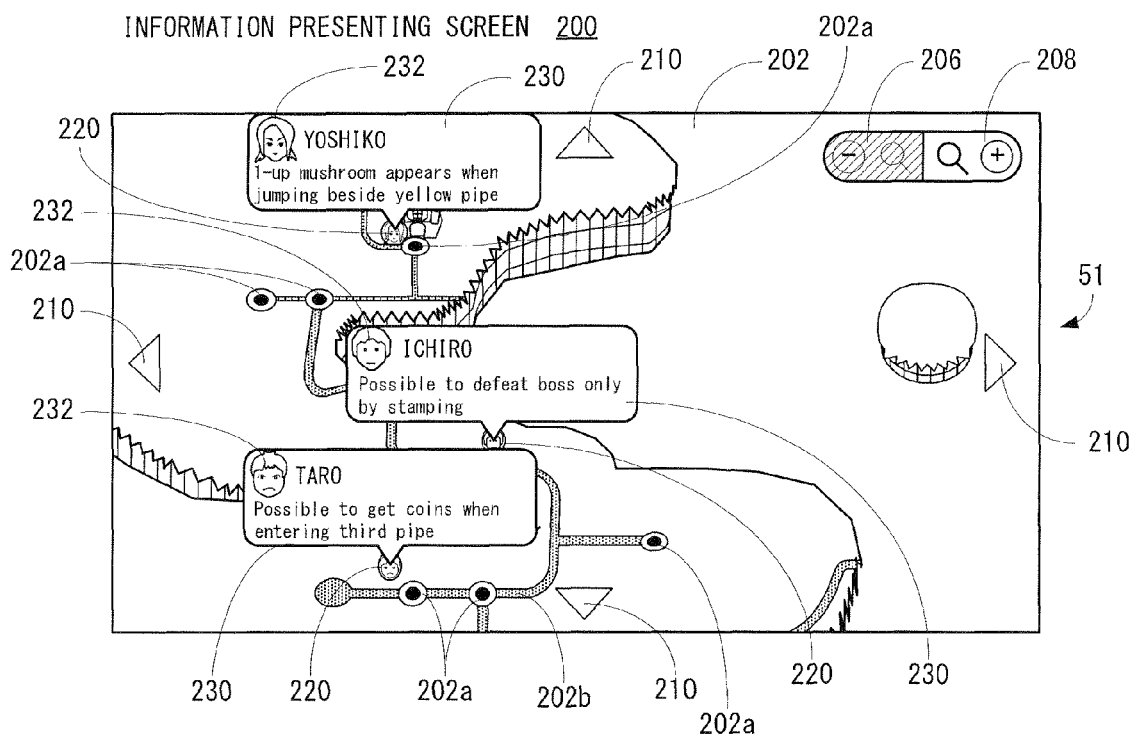

STORAGE MEDIUM, INFORMATION PROCESSING APPARATUS, INFORMATION PROCESSING SYSTEM AND INFORMATION PROCESSING METHOD

CROSS REFERENCE OF RELATED APPLICATION

The disclosure of Japanese Patent Application No. 2012-243769 filed on Nov. 5, 2012 is incorporated herein by reference.

FIELD

This application describes a storage medium, an information processing apparatus, an information processing system and an information processing method, using a plurality of display devices.

SUMMARY

It is a primary object of the present embodiment to provide a novel storage medium, information processing apparatus, information processing system and information processing method.

Another object of the present embodiment is to provide a storage medium, information processing apparatus, information processing system and information processing method, capable of suitably presenting information.

A first embodiment is a non-transitory computer readable storage medium storing an information processing program executable by a computer of an information processing apparatus which displays, based on an input from an input device, a virtual space on a portable-type display device and a stationary-type display device, wherein the information processing program causes the computer to function as an input acquiring portion, a position setting portion, a first displaying portion, and a second displaying portion. The input acquiring portion acquires an input from the input device. The position setting portion sets a designating position within the virtual space based on the input acquired by the input acquiring portion. A position of a virtual camera, for example is set on the basis of a position of a predetermined character or object within the virtual space, i.e. a designating position, and a point of gaze of the virtual camera is set at this designating position. The first displaying portion displays the virtual space on the stationary-type display device based on the designating position set by the position setting portion. The second displaying portion displays at least a part of the virtual space displayed on the stationary-type display device by the first displaying portion on the portable-type display device based on the designating position set by the position setting portion. The second displaying portion displays a whole or part of the virtual space displayed on the stationary-type display device on the portable-type display device, for example. In a case that predetermined information is included within a displaying range of the stationary-type display device, the first displaying portion displays an object representing presence of the predetermined information. On the other hand, in a case that the predetermined information is included within a displaying range of the portable-type display device, the second displaying portion displays an entity of the predetermined information.

According to the first embodiment, since the presence of the predetermined information is displayed on the stationary-type display device and the entity of the predetermined information is displayed on the portable-type display device, it is possible to obtain the information by seeing the screen of the portable-type display device and to easily perform an operation by seeing the screen of the stationary-type display device. That is, it is possible to present the information appropriately.

A second embodiment is according to the first embodiment, wherein the predetermined information is information associated with a predetermined position within the virtual space.

According to the second embodiment, the information associated with the predetermined position can be obtained by seeing the screen of the portable-type display device, an operation can be easily performed while seeing the screen of the stationary-type display device.

A third embodiment is according to the second embodiment, wherein the predetermined information includes at least text information associated with predetermined position.

According to the third embodiment, because the predetermined information is the text information associated with the predetermined position, the information can be obtained easily. Furthermore, since only the object representing that the text information exists is displayed on the stationary-type display device on which no text information is displayed, by making the object relatively smaller, it is possible to avoid a phenomenon that the screen becomes difficult to be seen.

A fourth embodiment is according to the second embodiment, wherein the predetermined information includes at least image information associated with the predetermined position.

According to the fourth embodiment, since the predetermined information is the image information associated with the predetermined position, it is possible to easily obtain the information intuitively. Furthermore, as similar to the third embodiment, since only the object representing that the image information exists is displayed on the stationary-type display device on which no image information is displayed, by making the object relatively smaller, it is possible to avoid a phenomenon that the screen becomes difficult to be seen.

A fifth embodiment is according to the second embodiment, wherein the predetermined information is information input by another user. For example, the predetermined information is a comment, message or figure (picture) input by another user.

According to the fifth embodiment, the information input by another user can be displayed on the portable-type display device.

A sixth embodiment is according to the fifth embodiment, wherein the object includes an image associated with another user.

According to the sixth embodiment, it is possible to know not only the presence of the predetermined information but also the user who inputs the predetermined information.

A seventh embodiment is according to the second embodiment, wherein the predetermined information is acquired from a network such as Internet.

According to the seventh embodiment, it is possible to acquire various users' comment information.

An eighth embodiment is according to the second embodiment, wherein the predetermined information is displayed at a predetermined position with which the predetermined information is associated or near the predetermined position.

According to the eighth embodiment, it is possible to easily know the predetermined position with which the predetermined information is associated. That is, it is possible to intuitively know a predetermined position which the predetermined information is directed for.

A ninth embodiment is according to the first embodiment, wherein the second displaying portion further displays an object representing presence of the predetermined information included in the displaying range of the portable-type display device.

According to the ninth embodiment, since the object representing presence of the predetermined information is further displayed, it is possible to make a corresponding relationship with the screen of the stationary-type display device easy to be understood.

A tenth embodiment is according to the first embodiment, wherein the second displaying portion makes at least the entity of the predetermined information displayed or non-displayed in response to that the predetermined input is acquired by the input acquiring portion.

According to the tenth embodiment, if the entity of the predetermined information is made non-displayed, it is possible to know the content similar to the displaying content of the stationary-type display device also from the displaying content of the portable-type display device. Furthermore, by displaying again the entity of the predetermined information, it is possible to easily know the predetermined position with which the predetermined information is associated.

An eleventh embodiment is according to the first embodiment, wherein the displaying range of the portable-type display device is wider than the displaying range of the stationary-type display device.

According to the eleventh embodiment, it is possible to present to the user the information of a wider range including the predetermined information.

A twelfth embodiment is an information processing apparatus which displays, based on an input from an input device, a virtual space on a portable-type display device and a stationary-type display device, comprising: an input acquiring portion which acquires an input from the input device; a position setting portion which sets a designating position within the virtual space based on the input acquired by the input acquiring portion; a first displaying portion which displays the virtual space on the stationary-type display device based on the designating position set by the position setting portion; and a second displaying portion which displays at least a part of the virtual space displayed on the stationary-type display device by the first displaying portion on the portable-type display device based on the designating position set by the position setting portion, wherein the first displaying portion displays an object representing presence of the predetermined information if and when predetermined information is included within a displaying range of the stationary-type display device, and the second displaying portion displays an entity of the predetermined information if and when the predetermined information is included within a displaying range of the portable-type display device.

A thirteenth embodiment is an information processing system which displays, based on an input from an input device, a virtual space on a portable-type display device and a stationary-type display device, comprising: an input acquiring portion which acquires an input from the input device; a position setting portion which sets a designating position within the virtual space based on the input acquired by the input acquiring portion; a first displaying portion which displays the virtual space on the stationary-type display device based on the designating position set by the position setting portion; and a second displaying portion which displays at least a part of the virtual space displayed on the stationary-type display device by the first displaying portion on the portable-type display device based on the designating position set by the position setting portion, wherein the first displaying portion displays an object representing presence of the predetermined information if and when predetermined information is included within a displaying range of the stationary-type display device, and the second displaying portion displays an entity of the predetermined information if and when the predetermined information is included within a displaying range of the portable-type display device.

A fourteenth embodiment is an information processing method of a computer which displays, based on an input from an input device, a virtual space on a portable-type display device and a stationary-type display device, the computer performing steps of: (a) acquiring an input from the input device; (b) setting a designating position within the virtual space based on the input acquired in the step (a); (c) displaying the virtual space on the stationary-type display device based on the designating position set in the step (b); and (d) displaying at least a part of the virtual space displayed on the stationary-type display device in the step (c) on the portable-type display device based on the designating position set in the step (b), wherein an object representing presence of the predetermined information is displayed in the step (c) if and when predetermined information is included within a displaying range of the stationary-type display device, and an entity of the predetermined information is displayed in the step (d) if and when the predetermined information is included within a displaying range of the portable-type display device.

Information is properly provided also in the twelfth to fourteenth embodiments, as similar to the first embodiment.

The above described objects and other objects, features, aspects and advantages of the embodiments will become more apparent from the following detailed description when taken in conjunction with the accompanying drawings.

BRIEF DESCRIPTION OF THE DRAWINGS

FIG. 4 is a view showing a non-limiting example course selecting screen and information presenting screen.

FIG. 6 is a view showing non-limiting example displaying ranges of a television game image and a terminal game image.

FIG. 7 is a view showing a further non-limiting example course selecting screen and information presenting screen.

FIG. 8 is a view showing a still further non-limiting example information presenting screen.

FIG. 9 is a view showing a yet still further non-limiting example information presenting screen.

DETAILED DESCRIPTION OF NON-LIMITING EXAMPLE EMBODIMENTS

Figure 1:
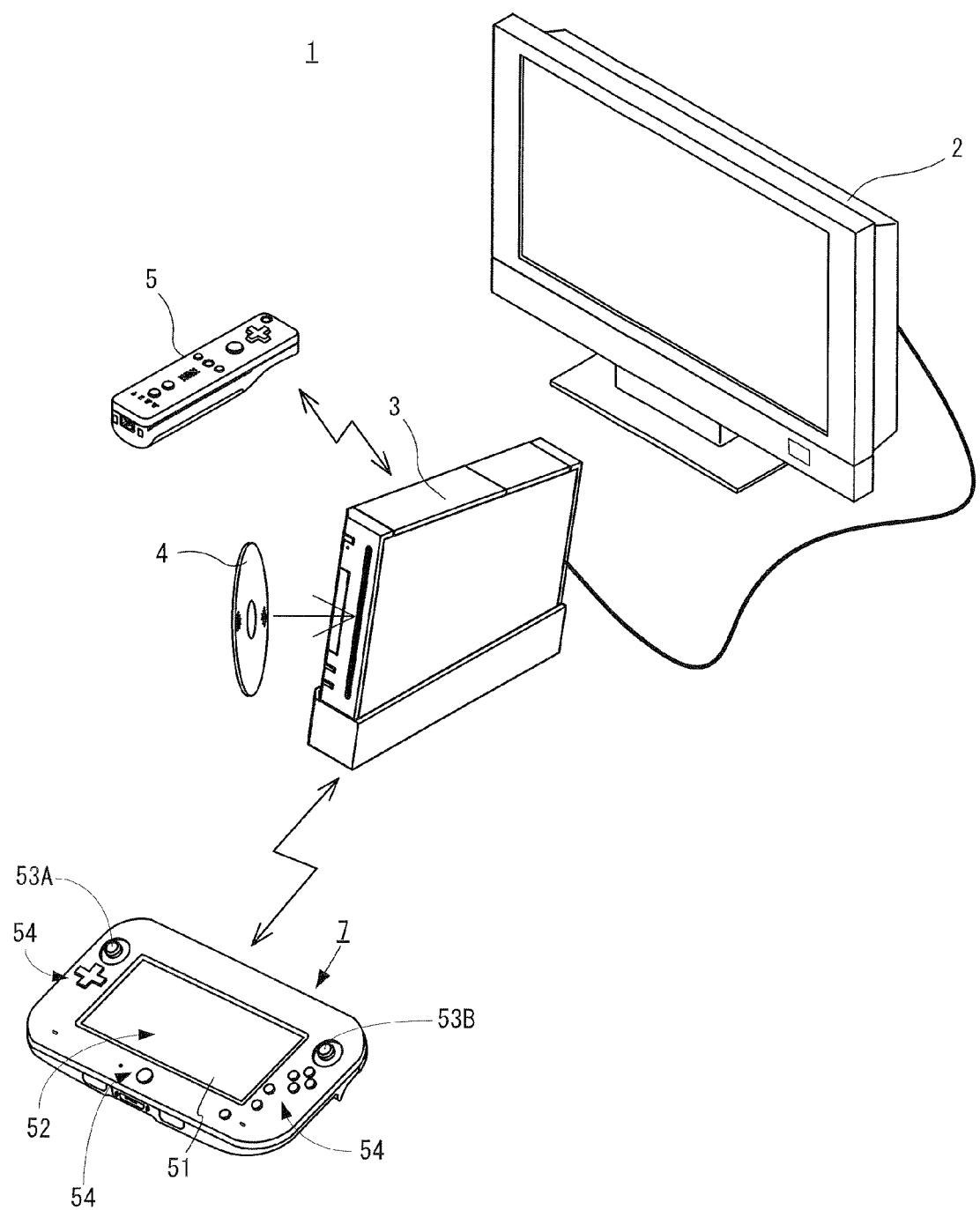
FIG. 1 is an appearance view of a non-limiting example game system.

A non-limiting example game system 1 is described with reference to drawings below. The game system 1 shown in FIG. 1 includes a stationary-type display device (hereinafter, referred to as "television") 2 typified by a television receiver or the like, a console-type game apparatus 3, an optical disk 4, a controller 5 and an input terminal device 7. The game system 1 is for performing game processing in the game apparatus 3 based on game operations by using the controller 5, and displaying a game image obtained by the game processing on the television 2 and/or the input terminal device 7.

Into the game apparatus 3, the optical disk 4 being one example of an information storage medium that is used to be replaceable with respect to the game apparatus 3 is detachably loaded. In the optical disk 4, an information processing program (typically, an application program such as a game program) to be executed in the game apparatus 3 is stored. The game apparatus 3 executes information processing (game processing) by reading and executing the information processing program stored in the optical disk 4 loaded into a loading slot provided on a front surface thereof.

To the game apparatus 3, the television 2 is connected via a connection cord. The television 2 displays a game image obtained through the game processing executed by the game apparatus 3. The television 2 has a speaker 2a (FIG. 2), and the speaker 2a outputs game sounds obtained as a result of the game processing described above.

Here, in another embodiment, the game apparatus 3 and the stationary-type display device may be integrally formed with each other. Furthermore, communications between the game apparatus 3 and the television 2 may be performed wirelessly.

The controller 5 is for providing operation data indicative of an operation made to its own controller (hereinafter, called as "controller operation data") to the game apparatus 3. The controller 5 is capable of communicating with the game apparatus 3 via a wireless communication using a technique of Bluetooth (registered trademark), for example; however, the controller 5 and the game apparatus 3 may be connected to each other with wire(s). In addition, in this embodiment, the number of the controllers 5 included in the game system 1 is one (1), but the game apparatus 3 is capable of communicating with a plurality of controllers 5, and therefore, it is possible for a plurality of persons to play a game by simultaneously using a predetermined number of the controllers 5. The controller 5 is provided with a cross button and various kinds of push buttons (A button, B button, + button, – button, 1 button, 2 button, home button, etc.), and transmits the controller operation data indicative of an input situation (whether depressed or not) with respect to the cross button and various kinds of the push buttons (may be collectively called as "operation button") to the game apparatus 3.

In addition, by providing an acceleration sensor and a gyro-sensor, the controller 5 can also transmits data (acceleration data and angular velocity data) associated with a direction (posture) of the controller 5 and a change (swinging operation or the like) of the direction (posture) to the game apparatus 3.

The input terminal device 7 transmits and receives data with at least the game apparatus 3. The user (player) can use the input terminal device 7 by moving it with his or her hands, and by placing the input terminal device 7 at an arbitrary position. Although a detailed description will be made later, the input terminal device 7 has a displaying means such as an LCD 51 and an inputting means such as a touch panel 52, analog sticks 53A and 53B and an operating button (cross button, A button, B button, X button, Y button, + button, – button, 1 button, 2 button, home button, etc.) 54. The input terminal device 7 can communicate with the game apparatus 3 through a wireless communication using a technique of Bluetooth (registered trademark), for example. However, the input terminal device 7 and the game apparatus 3 may be connected to each other by a cable or wire. The input terminal device 7 receives from the game apparatus 3 data of an image (game image, for example) produced in the game apparatus 3, and displays the image on the LCD 51. In other words, the input terminal device 7 functions as a portable-type display device. Furthermore, the input terminal device 7 transmits to the game apparatus 3 operation data indicating a content of the operation performed on the user's own device (hereinafter, called as "terminal operation data"). In other words, the input terminal device 7 also functions as an input device.

It should be noted that in this embodiment, an LCD is employed as a display device, but the input terminal device 7 may include another arbitrary display device such as a display using EL (Electro Luminescence), for example.

Additionally, in FIG. 1, the number of input terminal devices 7 included in the game system 1 is one, but the game apparatus 3 can communicate with a plurality of input terminal devices 7.

Figure 2:
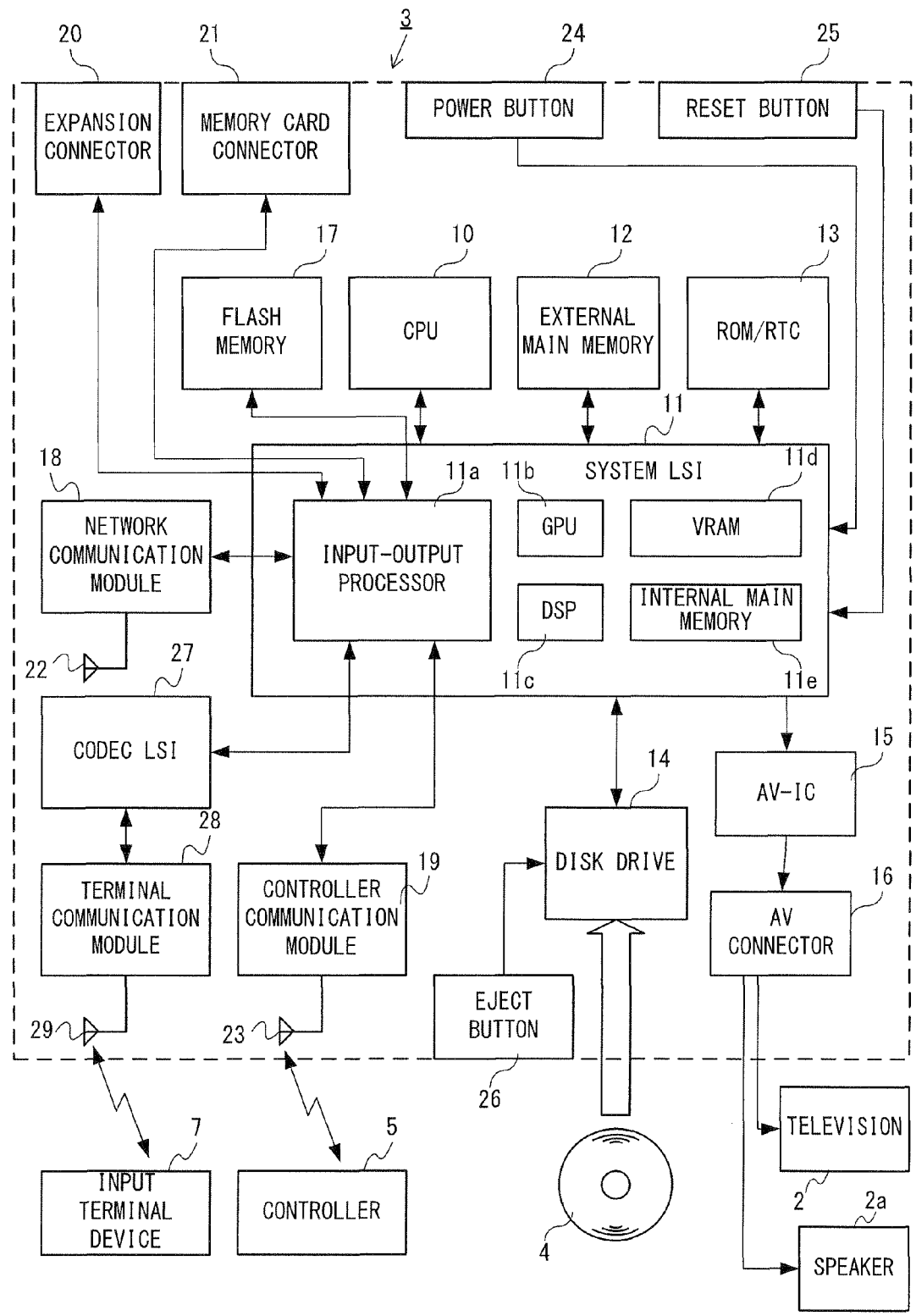
FIG. 2 is a block diagram showing a non-limiting example electric configuration of a game apparatus.

FIG. 2 is a block diagram showing a non-limiting example electric configuration of a game apparatus 3. The game apparatus 3 has a CPU 10, a system LSI 11, an external main memory 12, a ROM/RTC 13, a disk drive 14, an AV-IC 15, etc.

The CPU 10 is for executing game processing by executing the game program stored in the optical disk 4, and functions as a game processor. The CPU 10 is connected to the system LSI 11. The system LSI 11 is connected with the external main memory 12, the ROM/RTC 13, the disk drive 14 and the AV-IC 15 in addition to the CPU 10. The system LSI 11 performs processing of controlling data transfer between the respective components connected thereto, producing images to be displayed, acquiring data from external devices, and so on.

The external main memory 12 being volatile is for storing programs such as a game program read from the optical disk 4, a game program, etc. read from the flash memory 17, storing various data, and is utilized as a working area and a buffer area for the CPU 10. The ROM/RTC 13 has a ROM (so called a boot ROM) including a program for activating the game apparatus 3 and a clock circuit (RTC) for counting a time. The disk drive 14 reads program data, texture data, etc. from the optical disk 4, and writes the read data to an internal main memory 11e described later or the external main memory 12.

The system LSI 11 is provided with an input-output processor (I/O processor) 11a, a GPU 11b, a DSP 11c, a VRAM 11*d*, and the internal main memory 11*e*. Although illustration is omitted, these components 11*a*-11*e* are connected with each other by internal buses.

The GPU 11*b* configures a part of a depicting or drawing means, and produces image data according to a graphics command from the CPU 10. Here, data such as polygon data, texture data, etc. is stored in the VRAM 11*d*, and the GPU lib generates the image data by using such the data. In this embodiment, the game apparatus 3 generates both of a game image to be displayed on the television 2 and a game image to be displayed on the input terminal device 7. Hereinafter, the game image displayed on the television 2 may be called as "television game image", and the game image displayed on the input terminal device 7 may be called as "terminal game image".

The DSP 11*c* functions as an audio processor, and generates sound data by using sound data and sound waveform (tone) data stored in the internal main memory 11*e* and the external main memory 12. In this embodiment, with respect to the game sound, as similar to the game image, both of a game sound to be output from the speaker of the television 2 and a game sound to be output from the speaker of the input terminal device 7 are produced. Hereinafter, the game sound output from the television 2 may be called as "television game sound", and the game sound output from the input terminal device 7 may be called as "terminal game sound".

As described above, data of images and sounds (including sound effects, game music, etc. This holds true below.) to be output to the television 2 out of the images and sounds produced in the game apparatus 3 are read by the AV-IC 15. The AV-IC 15 outputs the read image data to the television 2 via the AV connector 16, and outputs the read sound data to the speaker 2*a* integrated in the television 2. Thus, an image is displayed on the television 2 while a sound is output from the speaker 2*a*.

Also, data of images and sounds to be output by the input terminal device 7 out of the images and sounds produced in the game apparatus 3 are transmitted to the input terminal device 7 by the input-output processor 11*a*, etc. The data transmission to the input terminal device 7 by the input-output processor 11*a*, etc. is described later.

The input-output processor 11*a* executes data transmission and reception with the components connected thereto, and executes downloading data from external devices. Also, the input-output processor 11a is connected to the flash memory 17, a network communication module 18, an expansion connector 20, a memory card connector 21, and a codec LSI 27. Furthermore, the network communication module 18 is connected with an antenna 22. The controller communication module 19 is connected with an antenna 23. The codec LSI 27 is connected to a terminal communication module 28, and the terminal communication module 28 is connected with an antenna 29.

The input-output processor 11*a* can be connected to networks like Internet, etc. via the network communication module 18 and the antenna 22, and communicate with external information processing apparatuses (other game apparatuses, various servers and so on, for example) being connected to the network.

The input-output processor 11*a* periodically accesses the flash memory 17 to detect the presence or absence of data required to be transmitted to the network, and if the data is present, transmits the data to the network via the network communication module 18 and the antenna 22.

Also, the input-output processor 11*a* receives data transmitted from external information processing apparatuses and data downloaded from a download server via the network, the antenna 22 and the network communication module 18, and stores the received data in the flash memory 17.

The CPU 10 executes the game program to thereby read the data stored in the flash memory 17 so as to use the data in the game program. In the flash memory 17, in addition to the data to be transmitted and received between the game apparatus 3 and the external information processing apparatuses, save data (result data or proceeding data of the game) of the game played by using the game apparatus 3 may be stored. Also, in the flash memory 17, the game program may be stored.

Furthermore, the game apparatus 3 can receive the controller operation data from the controller 5. More specifically, the input-output processor 11*a* receives the controller operation data sent from the controller 5 via the antenna 23 and the controller communication module 19 and stores (temporarily stores) the data in the buffer area of the internal main memory 11*e* or the external main memory 12.

Also, the game apparatus 3 can transmit and receive data of images or videos, sounds audio, etc. to and from the input terminal device 7. The input-output processor 11*a* outputs the data of the game image produced by the GPU 11*b* to the codec LSI 27 if transmitting the game image (terminal game image) to the input terminal device 7. The codec LSI 27 performs predetermined compression processing on the image data from the input-output processor 11*a*. The terminal communication module 28 communicates with the input terminal device 7 wirelessly. Accordingly, the image data compressed by the codec LSI 27 is transmitted to the input terminal device 7 via the antenna 29 by the terminal communication module 28. In this embodiment, the codec LSI 27 compresses the image data by using efficient compression technique, such as H.264 standard, for example.

It should be noted that a compression technique except for it may be used, and the image data may be adapted to be transmitted without being compressed if the communication speed is high enough.

Furthermore, the terminal communication module 28 is a communication module for which the Wi-Fi certification is obtained, for example, and may use a MIMO (Multiple Input Multiple Output) technique employed in IEEE802.11n standard, for example, to thereby make high speed wireless communications with the input terminal device 7, or may use other communication systems.

In addition, the game apparatus 3 transmits sound data to the input terminal device 7 besides the image data. That is, the input-output processor 11*a* outputs the sound data produced by the DSP 11*c* to the terminal communication module 28 via the codec LSI 27. The codec LSI 27 also performs the compression processing on the sound data, similar to the image data. The compression format of the sound data may be of any format. In another embodiment, the sound data may be transmitted without being compressed. The terminal communication module 28 transmits the compressed image data and sound data to the input terminal device 7 via the antenna 29.

Additionally, the game apparatus 3 can receive various data from the input terminal device 7. Although the detail is described later, in this embodiment, the input terminal device 7 sends terminal operation data, image data, and sound data. Each data transmitted from the input terminal device 7 is received by the terminal communication module 28 via the antenna 29. Here, the image data and the sound data from the input terminal device 7 undergoes compression processing similar to the image data and the sound data from the game apparatus 3 to the input terminal device 7.

Accordingly, the image data and the sound data are transmitted from the terminal communication module 28 to the codec LSI 27, then undergo expansion processing by the codec LSI 27, and output to the input-output processor 11a.

Figure 3:
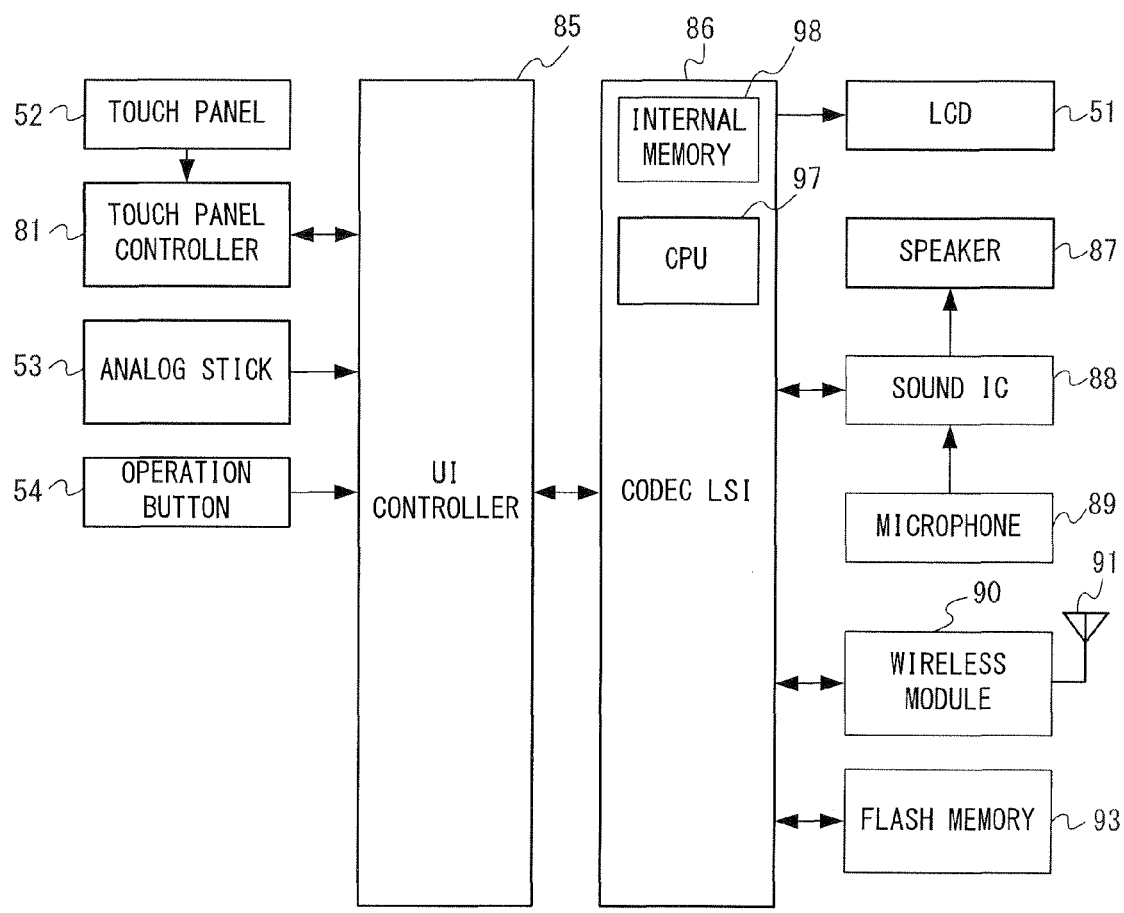
FIG. 3 is a block diagram showing a non-limiting example electric configuration of an input terminal device.

In addition, the image data from the input terminal device 7 includes image data corresponding to an image imaged by a camera not shown and so on, the sound data from the input terminal device 7 includes sound data corresponding to sounds (voice, hand clapping, etc.) that is generated by the player and detected by a microphone 89 (see FIG. 3).

On the other hand, the terminal operation data from the input terminal device 7, which has less data than images and sounds, may not be required to undergo the compression processing. Also, it may be encoded as required or may not be encoded. Accordingly, the terminal operation data is received in the terminal communication module 28, and then output to the input-output processor 11a via the codec LSI 27. The input-output processor 11a stores (temporarily stores) the data received from the input terminal device 7 in the buffer area of the internal main memory 11e or the external main memory 12.

Furthermore, the game apparatus 3 can connect to another appliance and an external storage. That is, the input-output processor 11a is connected with the expansion connector 20 and the memory card connector 21. The expansion connector 20 is a connector for interfaces such as USB, SCSI. The expansion connector 20 can be connected with a medium such as an external storage medium and connected with peripheral devices of other controllers, etc., and can make communication with networks in place of the network communication module 18 by being connected with a wired connector for communication.

The memory card connector 21 is a connector for being connected with an external storage such as a memory card. For example, the input-output processor 11a can access the external storage via the expansion connector 20 and the memory card connector 21, and can store data in the external storage and read data from the external storage.

The game apparatus 3 is provided with a power button 24, a reset button 25, and an eject button 26. The power button 24 and the reset button 25 are connected to the system LSI 11. When the power button 24 is turned on, electric power is supplied to the respective components of the game apparatus 3 from an external power source by an AC adapter not shown. When the reset button 25 is pushed, the system LSI 11 restarts an activation program of the game apparatus 3. The eject button 26 is connected to the disk drive 14. When the eject button 26 is pushed, the optical disk 4 is ejected from the disk drive 14.

It should be noted that in another embodiment, some components contained in the game apparatus 3 may be configured as an expansion unit provided separately from the game apparatus 3. At this time, the expansion unit may be connected to the game apparatus 3 via the aforementioned expansion connector 20, for example.

FIG. 3 is a block diagram showing a non-limiting example electric configuration of the input terminal device 7. As shown in FIG. 3, the input terminal device 7 has a touch panel controller 81, a user interface controller (UI controller) 85, a codec LSI 86, the speaker 87, a sound IC 88, a microphone 89, a wireless module 90, an antenna 91 and a flash memory 93 besides the components shown in FIG. 1. These electronic components are mounted on an electronic circuit board and contained in the housing 50.

Although illustration is omitted, the input terminal device 7 is supplied with power from an integrated battery or an external power source.

The UI controller 85 is a circuit for controlling an input and an output of data to and from various input-output portions.

The UI controller 85 is connected with the touch panel controller 81, the analog stick 53 (analog sticks 53A and 53B), and the operation button 54. Also, the UI controller 85 is connected to the codec LSI 86.

The touch panel controller 81 is connected to the touch panel 52, and is a circuit for performing a control on the touch panel 52. The touch panel controller 81 generates touched position data in a predetermined format on the basis of a signal from the touch panel 52 and outputs it to the UI controller 85. The touched position data represents coordinates of the position (touched position) where a touch input (touch operation) is made on an input surface of the touch panel 52. In this embodiment, the input operation is performed with a so-called singular touch, representing a "touch-on operation" or "slide operation". The "touch-on operation" represents an operation such that a state of a player's finger being not touched is changed to a state of the finger being touched (touched-on state). However, it can just be said as being "touched". Furthermore, the "slide operation" represents an operation for changing a position being touched in a state that the input surface keeps touched.

Here, the touch panel controller 81 performs reading signals from the touch panel 52 and generation of touched position data at each predetermined time. Furthermore, from the UI controller 85 to the touch panel controller 81, various control instructions with respect to the touch panel 52 are output.

The analog stick 53 outputs stick data representing a direction in which the stick portion to be operated by the fingers of the user is slid (or tilted) and an amount of the sliding to the UI controller 85. Furthermore, the operation button 54 outputs operation button data representing an input status (whether to be pushed or not) with respect to each operation button (a cross button and various push buttons) to the UI controller 85.

The UI controller 85 outputs terminal operation data including the touched position data, the stick data, the operation button data from the respective components described above to the codec LSI 86.

The codec LSI 86 is a circuit for performing compression processing on data to be transmitted to the game apparatus 3 and expansion processing on the data transmitted from the game apparatus 3. The codec LSI 86 is connected with the LCD 51, the sound IC 88, the wireless module 90, and the flash memory 93. Also, the codec LSI 86 includes a CPU 97 and an internal memory 98.

The input terminal device 7 is adapted so as not to perform the game processing itself, but needs to execute a minimum program for management and communication of the input terminal device 7. When the power is turned on, the CPU 97 reads the program stored in the flash memory 93 into the internal memory 98 and executes it to thereby activate the input terminal device 7. Here, the input terminal device 7 is activated and suspended on the basis of operation data from the game apparatus 3. It should be noted that in this embodiment, the suspension of the input terminal device 7 means a sleep state in which power is supplied to a part of the circuit components (UI controller 85, codec LSI 86 and wireless module 90). In addition, a partial area of the internal memory 98 is used as a VRAM for the LCD 51.

The sound IC 88 is connected to the speaker 87 and the microphone 89, and is a circuit for controlling an input and output of sound data to and from the speaker 87 and the microphone 89. That is, in a case that sound data is received from the codec LSI 86, the sound IC 88 outputs a sound signal obtained by performing D/A conversion on the sound data to the speaker 87, to thereby make the speaker 87 output a sound. Also, the microphone 89 detects sound (voices and cracks (hand clapping), etc. of the user (player)) propagated to the input terminal device 7, and outputs a sound signal indicating the sound to the sound IC 88. The sound IC 88 performs A/D conversion on the sound signal from the microphone 89, and outputs the sound data in the predetermined format to the codec LSI 86.

The codec LSI 86 transmits to the game apparatus 3 the image data from the camera, the sound data from the microphone 89, and the terminal operation data from the UI controller 85 via the wireless module 90. In this embodiment, the codec LSI 86 performs compression processing on the image data and the sound data similar to the codec LSI 27. The terminal operation data and the compressed image data and sound data described above are output to the wireless module 90 as transmission data.

The wireless module 90 is connected with the antenna 91, and the wireless module 90 transmits the aforementioned transmission data to the game apparatus 3 via the antenna 91. The wireless module 90 has a function similar to the terminal communication module 28 of the game apparatus 3. That is, the wireless module 90 has a function of connecting to the wireless LAN following the system based on the IEEE 802.11n standard, for example. The data to be transmitted may be encoded as required or may not be encoded.

As described above, the input terminal device 7 has the inputting means such as the touch panel 52, the analog stick 53, and the operation button 54, but may be adapted to have other inputting means in place of these inputting means, or with these inputting means in another embodiment. For example, as sensors for evaluating a motion (including a position and posture, or changes in the position and the posture) of the input terminal device 7, at least one of a magnetic sensor, an acceleration sensor and a gyro sensor may be provided.

Additionally, the input terminal device 7 is configured to have the camera and the microphone 89, but in another embodiment, it may not have the camera and the microphone 89, or may have either one of them.

In an application (virtual game) performed in such a game system 1, according to an operation by the player or user, the player character performs a movement (running, jumping, flying, etc.) and an arbitrary action (holding, taking, stamping, throwing, kicking, etc.), advances in a course from a start point, avoids an enemy character or an attack thereof, knocks-down the enemy character, or gets a predetermined item. Then, if the player character reaches a goal point within a limiting time, the course is cleared. However, if the player character is attacked by the enemy character or if the limiting time elapses prior to the player character reaching the goal point, it is determined that the player character has made a mistake, and therefore, a remaining vital value of the player character is subtracted by one (1). Then, if the remaining vital value of the player character becomes zero (0), the game is made over.

In such a virtual game, if the course is cleared, it is possible to proceed to a next course, and to freely select a course having been cleared once. The course can be selected at a time of the start of the virtual game, a time that the course is cleared or a time of the mistake occurring. In a case that the course is to be selected, a television game image (here, a course selecting screen 100) as shown in FIG. 4(A) is displayed on the television 2, and a terminal game image (here, an information presenting screen 200) as shown in FIG. 4(B) is displayed on the LCD 51 of the input terminal device 7.

In addition, in the drawing of this embodiment, the course selecting screen 100 and the information presenting screen 200 are shown with the same size; however, a size of the course selecting screen 100 is equal to a size of a displaying screen of the television 2, and a size of the information presenting screen 200 is a size equal to a displaying screen of the LCD 51 of the input terminal device 7.

As shown in FIG. 4(A), the course selecting screen 100 displays a part of a map (hereinafter, called as "world map") 102 for selecting a course produced in a three-dimensional virtual space. The world map 102 is constructed by a background, a course mark 102*a*, a route image 102*b*, a castle object 102*c* and a non-player character, etc. The course mark 102*a* is a mark corresponding to a course, and represented by an image that a black circle is indicated in a white circle. Respective course marks 102*a* are connected by the route image 102*b*. Furthermore, in a case that the castle object 102*c* is displayed in the vicinity of the course mark 102*a*, it is indicated that a course corresponding to the course mark 102*a* is a course in the castle.

In addition, "course identification information" described later is assigned to each course mark 102*a* (also to a course mark 202*a*).

On the world map 102, a player character 104 is displayed. In addition, an icon 106 for displaying a menu screen is displayed in an upper right portion of the course selecting screen 100 in the front of the world map 102. Furthermore, in a lower right portion of the course selecting screen 100 in the front of the world map 102, an icon 108 for displaying (seeing) an item held by the player character 104 is displayed. An icon 110 for shifting to a mode that the world map 102 is scrolled (looked around) is displayed in a lower left portion of the course selecting screen 100 in the front of the world map 102. A designating object 120 is displayed in the vicinity of the course mark 102*a* in the front of the world map 102. The designating object 120 is an object indicating that predetermined information about a course corresponding to the course mark 102*a* being displayed there near exists. As seen from FIG. 4(A), the designating object 120 is an image that a face image for an avatar of a player who inputs a comment is adhered (attached) to a balloon object; however, as the designating object 120, only a face image for an avatar of a player may be displayed, or only a predetermined object such as a balloon object that a name of an avatar of a player is written may be displayed. Furthermore, in this embodiment shown, the predetermined information is a message or comment (hereinafter, simply called as "comment") in connection to a corresponding course, and such a comment is input by another player. As described later, the comment (comment information) is acquired (downloaded) from a dedicated server. As described above, since the face object of the avatar of the player is attached to the designating object 120, the designating object 120 can represent not only the existence of the predetermined information (comment) but also a player who sends the comment.

A detailed description will be omitted here, but the dedicated server means a server which is connected via Internet, and stores comment information sent from a game apparatus capable of playing a virtual game of this embodiment, and sends to the game apparatus the comment information from the player other than the player of that game apparatus in response to a request from the game apparatus.

Furthermore, in this embodiment, for simplicity, as the predetermined information, only a comment is input by the player, but the player can input a hand-written image, including not only a picture (drawing) depicted by the player but also a symbol such as a character. Therefore, it is possible to indicate a place where a predetermined item exists, for example, by a hand-written image. That is, the predetermined information includes not only text information such as a comment but also image information such as a hand-written information, and so forth.

Furthermore, as shown in FIG. 4(B), the information presenting screen 200 displays a part of the world map 202 produced in the three-dimensional virtual space, and the player character 204 is displayed on the world map 202. It should be noted that in FIG. 4(B), the player character 204 is hidden in a back surface of the comment displaying area 230 at a center of the information presenting screen 200. Furthermore, in the information presenting screen 200, the same world map produced in the same virtual space as that of the above-described course selecting screen 100 is displayed, and the player character is also the same.

Returning to FIG. 4(B), in an upper right portion of the information presenting screen 200 in the front of the world map 202, an icon 206 for making a second virtual camera C2 zoom-out (see FIG. 5) for displaying the information presenting screen 200 and an icon 208 for making the second virtual camera C2 zoom-in are displayed side-by-side. In the front of the world map 202, arrow mark images 210 are displayed in centers of an upper end portion, a lower end portion, a left end portion and a right end portion of the information presenting screen 200. The arrow mark image 210 is an image for indicating a direction capable of changing a displaying range of the world map 202, that is, a direction opposite to a direction that the screen is scrolled.

In the information presenting screen 200, as similar to the course selecting screen 100, a course mark 202a is displayed, and respective course marks 202a are connected by a route image 202b. There is an occasion that a castle object 202c being the same as the castle object 102c is displayed near the course mark 202a. Then, a designating object 220 being the same as the designating object 120 is displayed near the course mark 202a. Furthermore, in this information presenting screen 200, a comment displaying area 230 is displayed in such a manner that the comment pops up from the designating object 220. In each comment displaying area 230, a face image 232 of an avatar for a player who inputs a comment is displayed at an upper left portion, and at a right side of the face image 232, a name attached to the avatar is displayed. Therefore, the face image 232 is the same image attached to the designating object 220 which is displayed in a manner that the comment displaying area 230 pops up. Furthermore, in the displaying area 230, a comment input by a player who uses an avatar corresponding to the face image 232 is displayed (text displaying).

For example, in a case that the course is to be selected, the player moves the player character 104 and selects a desired course by operating the controller 5 while seeing the course selecting screen 100 displayed on the television 2. At this time, the player keeps the input terminal device 7 at a hand, and obtains information such as a hint for clearing the course, a getting method of an item in the course, etc., while seeing a comment related to the course. A reason why the comment is thus displayed in the information presenting screen 200 is that as seen from FIG. 4(B), the comment displaying area 230 is displayed in the forefront, and therefore, it is difficult to see the world map 202 and the player character 204 both being displayed in the back of the comment displaying area 230. Therefore, in the course selecting screen 100 displayed on the television 2, basically only the presence of the comment is notified to the player by the designating object 120, and the entity (specific content) is displayed in the information presenting screen 200.

The comment can be input at a predetermined timing such that the course is cleared or that the mistake occurs, for example. Although not shown, in inputting a comment, a screen for inputting a comment is displayed on the television 2 or the LCD 51 of the input terminal device 7. If the player inputs a comment related to a course that the player has cleared or the player has made a mistake, the predetermined information (hereinafter, called as "comment information") including identification information of the course, input comment (text information), and information of an avatar corresponding to the player (information of the face image and a name thereof) is sent to the dedicated server via Internet from the network communication module 18 and the antenna 22. On the other hand, the game apparatus 3 acquires (downloads) the comment information by accessing the dedicated server at a time when the virtual game of this embodiment is started. Although a detailed description is omitted here, in this embodiment shown, worlds for a plurality of themes such as a field, desert, sea, forest, ice (snow), etc., are set. Then, in each of the worlds, a plurality of courses produced in accordance with respective themes are provided. In this embodiment, for each world, the predetermined number of (64, for example) comment information is randomly downloaded. Therefore, even if a course is a course that the comment information is stored in the dedicated server, the comment information may not be downloaded. Furthermore, a plurality of comment information may be downloaded for a single course. Of course, no comment information is downloaded for a course that the comment information is not stored in the dedicated server.

In addition, in this embodiment, when the virtual game is started, the comment information is downloaded; however, the comment information may be downloaded by accessing the dedicated server periodically or in response to an instruction by the player.

Then, the game apparatus 3 displays, when producing the course selecting screen 100, the designating object 120 in the vicinity of the course mark 102a corresponding to the course that the comment exists in a case that the comment exists within the displaying range. The designating object 120 is produced (drawn) with using the information of the avatar (information of the face image) included in the comment information.

Furthermore, in a case that the comment exists in the displaying range, the game apparatus 3 displays, when producing the information presenting screen 200, the designating object 220 in the vicinity of the course mark 202a corresponding to the course that the comment exists, and displays the displaying area 230 in a manner that the displaying area 230 pops up from the designating object 220. The designating object 220 is produced (drawn) with using the comment and the information of the avatar (information of the face image) included in the comment information. Furthermore, the displaying area 230 is produced (drawn) with using the information of the avatar (information of the face image and name thereof) and comment included in the comment information.

Although an example described using FIG. 4(A), FIG. 4(B) was described such that the designating object (120, 220) and the displaying area 230 are always displayed when the comment exists, in fact, there is an occasion that the designating object (120, 220) and the displaying area 230 are not displayed even if the comment exists. This is for preventing overlapping of the displaying areas 230.

Here, a displaying method of the designating object (120, 220) and the displaying area 230 (comment) in the virtual space (hereinafter, may be called as "comment displaying processing") will be specifically described. It should be noted that the displaying processing described in the following is performed for each world.

(1) At first, a single comment information is randomly selected from a predetermined number of comment information downloaded, the designating object (120, 220) is displayed in the vicinity of the course mark (102a, 202a) corresponding to a course indicated by the identification information included in the selected comment information, and the displaying area 230 is displayed in a manner that the same pops up from the designating object (120, 220).

(2) Next, a course mark (102a, 202a) not too close to the course mark (102a, 202a) corresponding to the course that the displaying area 230 (comment) is displayed in the step of (1) is selected. Then, the comment about the course corresponding to the selected course mark (102a, 202a) is displayed. That is, the comment information about the course corresponding to the selected course mark (102a, 202a) is selected, the designating object (120, 220) is displayed in the vicinity of the course mark (102a, 202a), and the displaying area 230 is displayed so as to pop up from the designating object (120, 220).

However, if a plurality of comment information exist for the course corresponding to the selected course mark 202a, a single comment information out of the plurality of comment information is randomly selected. Furthermore, if no comment information exists for the course corresponding to the selected course mark 202a, the processing proceeds to a next step with no operation.

(3) Furthermore, the course mark (102a, 202a) not too close to the course mark (102a, 202a) corresponding to the course that the comment (displaying area 230) is displayed in the steps of (1) and (2) is selected, and the comment for the course corresponding to the selected course mark (102a, 202a) is displayed. The displaying of the comment is the same as that described in the step of (2), and therefore, a duplicate description will be omitted.

(4) The step of (3) is repeatedly performed until a predetermined number of (here, four (4)) comments (displaying area 230) are displayed for each world; however, if no course capable of being displayed exists prior to the predetermined number of the comments being displayed, the displaying processing of the comment is ended at that time.

In addition, a reason why the course mark (102a, 202a) not too close to the course mark (102a, 202a) corresponding to the course that the comment (displaying area 230) is displayed in the steps of (2) and (3) is selected is for presenting to the player the comment easy to be understood by preventing the overlapping of the displaying areas 230.

In addition, the above-described displaying processing is only one example, and not limited thereto. If the comment information for the course corresponding to the course mark 202a of the displaying range exists, the comment (displaying area 230) may be all displayed without taking the overlapping of the comments (displaying areas 230) into account. In such a case, the overlapped comments (displaying areas 230), by exchanging the front and the back by a button operation, for example, may be made being referred to.

Figure 5:
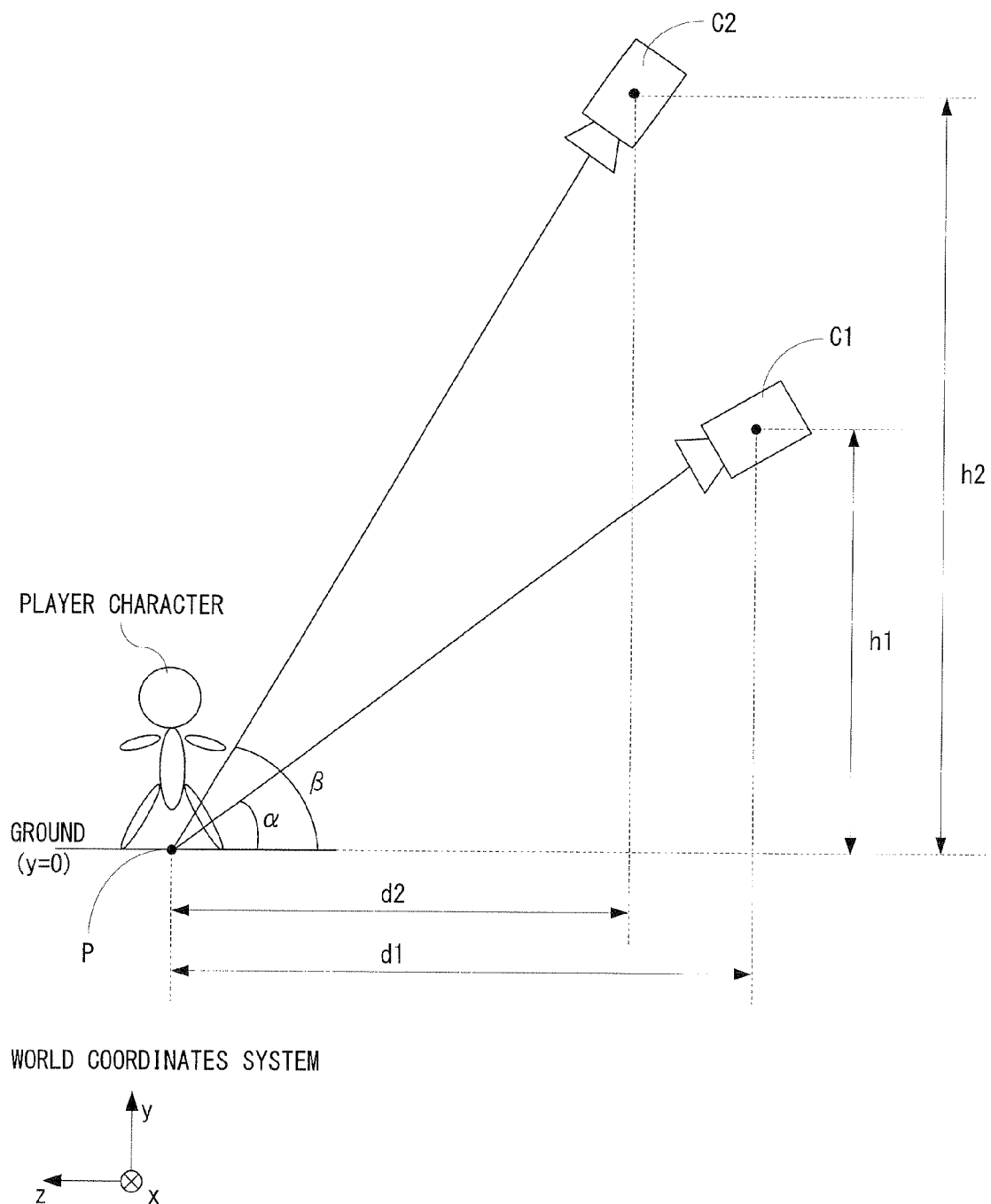
FIG. 5 is a view showing a non-limiting example position and point of gaze of a virtual camera which is for producing the course selecting screen and the information presenting screen.

Furthermore, in this embodiment shown, as shown in FIG. 5, a first virtual camera C1 for producing the course selecting screen 100 and a second virtual camera C2 for producing the information presenting screen 200 are provided. That is, there are provided with the first virtual camera C1 for producing a screen for the television 2 and the second virtual camera C2 for producing a screen for the LCD 51 of the input terminal device 7.

The first virtual camera C1 follows the player character 104 (204) from a minus (−) side of the z axis of the three-dimensional virtual space. More specifically, the first virtual camera C1 is basically arranged at a position of a distance d1 in the minus (−) direction of the z axis and a distance (height) h1 in a plus (+) direction of the y axis on the basis of a position P of the player character 104 (204), and set such that a point of gaze is the position P; however, an offset value (x, y, z) set in advance with respect to a point corresponding to the position P of the player character 104 (204) is added to the position decided as described above. Therefore, if the offset value is not added, an angle alpha ($\alpha$) made by a line of sight of the first virtual camera C1 with the horizontal surface is kept constant. In addition, in FIG. 5, a height of the ground (horizontal surface) is made as y=0. Furthermore, in this embodiment shown, the comment itself (displaying area 230 of the information presenting screen 200) is not displayed in the course selecting screen 100, and therefore, the first virtual camera C1 does not image the displaying area (230). That is, in a case that the course selecting screen 100 is to be produced, the displaying area (230) is not drawn. Furthermore, since the player character 104 (204) is moved in virtual space in accordance with an operation (designation) by the player, it is possible to say that the position P of the player character 104 (204) is a position according to the operation (designation) by the player, i.e. designating position.

The second virtual camera C2 follows the player character 104 (204) from a minus (−) side of the z axis of the three-dimensional virtual space as similar to the first virtual camera C1, but a height thereof is fixed in the virtual space. In FIG. 5, the second virtual camera C2 is arranged at a position decided by a distance d2 (<d1) in the minus (−) direction of the z axis and a distance (height) h2 (>h1) in a plus (+) direction of the y axis on the basis of a position P of the player character 104 (204), and set such that a point of gaze is the position P. In addition, in FIG. 5, the height of the ground is set as y=0. Therefore, the second virtual camera C2 is moved, if the position P of the player character 104 (204) is changed, in the x axis direction and the z axis direction so as to keep the distance d2 according to the change of the position P, but since the height h2 is fixed, the second virtual camera C2 is not moved in the y axis direction. That is, as to the second virtual camera C2, the above-described relationship (positional relationship) is always kept on the basis of a position that a y component of the position P of the player character 104 (204) is made zero (0) (hereinafter called as "focus position").

In addition, in this embodiment, the height h2 of the second virtual camera C2 is fixedly decided on the basis of the height of the predetermined ground (y=0); however, as similar to the first virtual camera C1, the second virtual camera C2 may be changed in a height direction according to the position P of the player character 104 (204).

Furthermore, in this embodiment, the x axis direction of the virtual space corresponds to the horizontal direction of the television 2 and the LCD 51, and the z axis direction of the virtual space corresponds to the vertical direction of the television 2 and the LCD 51.

Here, displaying ranges of the television game image (course selecting screen 100) and the terminal game image (information presenting screen 200) in a case that the course is to be selected, that is, imaging ranges of the first virtual camera C1 and the second virtual camera C2 will be described.

Although not shown, in a case that the no zoom control is to be performed, an angle of view of the first virtual camera C1 and an angle of view of the second virtual camera C2 are the same. Furthermore, as shown in FIG. 5, a distance of the second virtual camera C2 with respect to the player character 104 (204) in the z axis direction is shorter than that of the first virtual camera C1, and the distance (height) of the second virtual camera C2 with respect to the player character 104

(204) in the y axis direction is longer (higher) than that of the first virtual camera C1. That is, the second virtual camera C2 images the virtual space (game map 102 (202)) from a direction closer to the right above than the first virtual camera C1.

Therefore, as shown in FIG. 6, the displaying range 300 of the television game image (course selecting screen 100) imaged by the first virtual camera C1 and the displaying range 302 of the terminal game image (information presenting screen 200) imaged by the second virtual camera C2 are different from each other. In an example shown in FIG. 6, the displaying range 302 is wider than the displaying range 300, and includes a part of the displaying range 300. Furthermore, as seen from FIG. 4(A) and FIG. 4(B), the information presenting screen 200 is an image of a case that the virtual space (world map 102 (202)) is viewed from a direction closer to the right above than the course selecting screen 100, and thus, displays a range wider than the course selecting screen 100.

A reason why the world map 202 obtained by viewing from a direction closer to the right above a wider range than the course selecting screen 100 is displayed in the information presenting screen 200 is for presenting to the player the information about a relatively wider range.

In addition, in this embodiment shown, the information presenting screen 200 for a wider range than that of the course selecting screen 100 is displayed, but not limited to such a situation. A range and a content to be displayed can be suitably changed according to the information to be presented. In a case that the player character looks around the world map through a binocular, for example, it is possible to display an image of a range narrower than that of the course selecting screen 100 and an image of a range that the player character looks the three-dimensional virtual space (world map) through a binocular as the information presenting screen 200.

Furthermore, as described above, in the course selecting screen 100, if the player operates the cross button of the controller 5, in response to the operation, the player character 104 moves according to the route image 102b formed in the world map 102. At this time, in the information presenting screen 200, since the same world map 202 is displayed, the player character 204 is also moved according to the route image 202b formed in the world map 202 in response to the operation of the controller 5.

In a case that the course selecting screen 100 shown in FIG. 4(A) is being displayed, for example, if the player designates a downward direction by operating the cross button of the controller 5, the player character 104 moves to the course mark 102a in the front of the castle object 102c (back of the icon 108). If the player designates a rightward direction by operating the cross button of the controller 5, the player character 104 is moved to a branching point of the route image 102b at a lower right side of the castle object 102c as shown in FIG. 7(A).

As described above, if the player designates the downward direction by operating the cross button of the controller 5, in the information presenting screen 200 shown in FIG. 4(B) the player character 204 moves to the course mark 202a in the front of the castle object 202c (a lower side of the displaying area 230 of a screen center). Furthermore, if the player designates the rightward direction by operating the cross button of the controller 5, as shown in FIG. 7(B), the player character 204 is moved to a branching point of the route image 202b at a lower right side of the castle object 202c.

That is, in selecting a course, by operating the cross button of the controller 5, the player character 104 (204) is moved on the world map 102 (202), and such a situation is displayed on the course selecting screen 100 and the information presenting screen 200, respectively. In this case, it can be said that the player character 204 in the information presenting screen 200 moves to be linked to (follows) the player character 104 in the course selecting screen 100. Furthermore, in a case that the player character 104 is positioned on the course mark 102a, if the 2 button of the controller 5 is operated, it is selected (decided) that a course corresponding to the course mark 102a is played. Then, the game play for the decided course is started. At this time, instead of the course selecting screen 100 and the information presenting screen 200, a game screen for the decided course is displayed on the television 2 and the LCD 51 of the input terminal device 7, respectively.

In addition, although a detailed description is omitted here, in a case that the course selecting screen 100 is being displayed, if the + button of the controller 5 is operated by the player, the icon 106 is selected and the menu screen for selecting a menu that the virtual game is stopped, saved, etc., is displayed. Furthermore, if the player operates the 1 button of the controller 5, an item screen for displaying an item held by the player character 104 is displayed. If the A button of the controller 5 is operated by the player, a screen of the same content as that of the information presenting screen 200 is displayed on the television 2.

It is possible to scroll or zoom the information presenting screen 200 by operating the input terminal device 7 regardless of the course selecting screen 100. In such a case, the above-described linkage (following) of the player character 204 to the player character 104 is canceled. That is, the second virtual camera C2 is moved according to the position P of the player character 104 (204), but the position of the second virtual camera C2 is moved in the x, z directions in the three-dimensional virtual space according to the operation by the player.

If a slide operation is performed on the touch panel 52 of the input terminal device 7, for example, the displaying range is moved toward a direction of the slide operation. That is, the x coordinates and/or the z coordinates of the second virtual camera C2 are changed in accordance with the slide operation. Therefore, the information presenting screen 200 is scrolled in the same direction as a direction of the slide operation. Accordingly, in a case that the information presenting screen 200 shown in FIG. 4(B) is being displayed, for example, if the player performs the slide operation on the touch panel 52 in an upper left direction, the information presenting screen 200 shown in FIG. 4(B) is scrolled in an upper left direction, and thus, the information presenting screen 200 as shown in FIG. 8 is displayed on the LCD 51.

In addition, not limited to the touch operation, it is possible to scroll the information presenting screen 200 by operating the analog stick 53 or the cross button.

Furthermore, in a case that the information presenting screen 200 is scrolled, as shown in FIG. 8, an icon 212 is displayed in a lower left portion of the screen. Therefore, if the icon 212 is touched or the A button of the input terminal device 7 is operated, the icon 212 is selected, and thus, it is designated to be returned to the current position. That is, the second virtual camera C2 is moved so as to be a predetermined positional relationship on the basis of the focus position that the y component of the position P of the player character 204 is made zero (0). At this time, the player character 204 is restored to a state that the same is linked to (follows) the player character 104.

Furthermore, if the icon 206 or 208 displayed on the information presenting screen 200 is touched or the − button or the + button is operated, the information presenting screen 200 is zoomed-out or zoomed-in. In this embodiment, when the icon 206 is touched or the − button is operated, the information presenting screen 200 is zoomed-out. If the icon 208 is touched or the + button is operated, the information presenting screen 200 is zoomed-in. Although not shown, for example, in a case of the zooming-out, the distance d2 and the height h2 are adjusted such that the second virtual camera C2 is kept away from the player character 104 (204) while the angle beta (β) shown in FIG. 5 is maintained. In a case of the zooming-in, the distance d2 and the height h2 are adjusted such that the second virtual camera C2 is brought close to the player character 104 (204) while the angle beta (β) shown in FIG. 5 is maintained. However, in either case of the zooming-out and zooming-in, the angle of view of the second virtual camera C2 is not changed. FIG. 9 shows that in a case that the information presenting screen 200 shown in FIG. 4(B) is being displayed, if the icon 206 is touched or the − button is operated, the information presenting screen 200 in a state of being zoomed-out is displayed. As seen from comparison of FIG. 4(B) and FIG. 9, the displaying range of the information presenting screen 200 shown in FIG. 9 is wider than the displaying range of the information presenting screen 200 shown in FIG. 4(B).

Although a detailed description is omitted here, in a case that the − button or the + button is depressed, the image is changed in a manner that the second virtual camera C2 is moved with a predetermined speed (a predetermined distance per frame), and therefore, the zooming-in or the zooming-out is changed lineally. It should be noted that the frame means a unit time (1/60 seconds, for example) for renewing the screen.

In addition, in this embodiment, the zooming-out and the zooming-in are controlled by changing the distance d2 and the height h2 so as to maintain the angle beta (β), but not limited to such a control. For example, the zooming-out and the zooming-in may be controlled by changing the angle of view while the position of the second virtual camera C2 is fixed.

Figure 10:
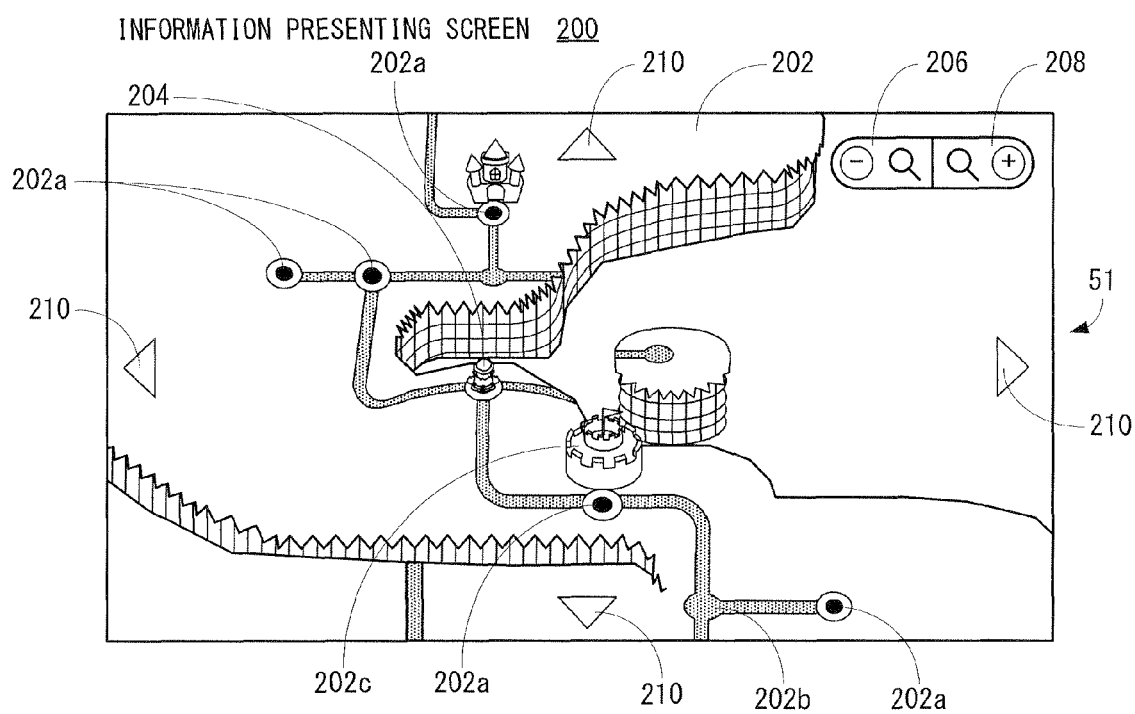
FIG. 10 is a view showing the other non-limiting example information presenting screen.

Furthermore, it is possible to make the designating object 220 and the displaying area 230 be non-displayed or displayed again by operating the input terminal device 7. In a state where the information presenting screen 200 shown in FIG. 4(B) is being displayed on the LCD 51, for example, the designating object 220 and the displaying area 230 becomes non-displayed as shown in FIG. 10, if the player operates the B button provided on the input terminal device 7. In this state, if the player operates again the B button provided on the input terminal device 7, the designating object 220 and the displaying area 230 become to be displayed. That is, the information presenting screen 200 returns to FIG. 4(B).

In the information presenting screen 200, when the designating object 220 and the displaying area 230 are non-displayed, the player can see the details of the world map on the screen at hand.

In addition, in this embodiment, in response to the operation of the B button provided on the input terminal device 7, both of the designating object 220 and the displaying area 230 are made non-displayed or displayed; however, only the displaying area 230 may be made non-displayed or displayed.

Figure 11:
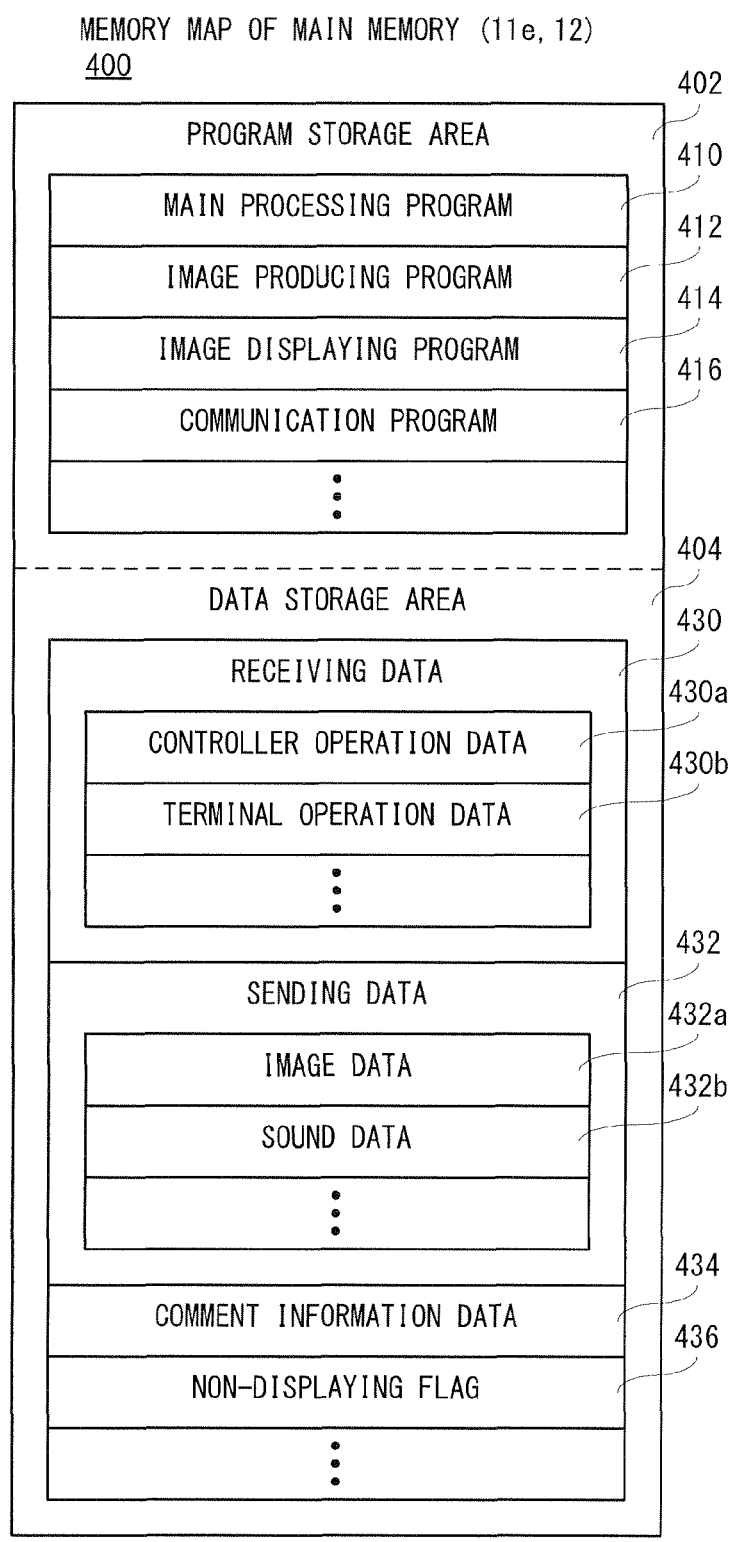
FIG. 11 is a view showing a non-limiting example memory map of a main memory shown in FIG. 2.

FIG. 11 shows an example of a memory map 400 of the main memory (11e, 12) of the game apparatus 3 shown in FIG. 2. As shown in FIG. 11, the main memory (11e, 12) includes a program storage area 402 and a data storage area 404. The program storage area 402 is stored with an information processing program such as a game program. For example, the game program is partly or wholly read from the optical disk 4 at a suitable timing after the power of the game apparatus 3 is turned-on so as to be stored in the main memory.

In addition, the game program may be acquired from the flash memory 17 or an external device of the game apparatus 3 (via Internet, for example) instead of the optical disk 4. Furthermore, a part of the program included in the game program may be stored in the game apparatus 3 in advance.

In this embodiment, the game program includes a main processing program 410, an image producing program 412, an image displaying program 414, a communication program 416, etc.

Figure 13:
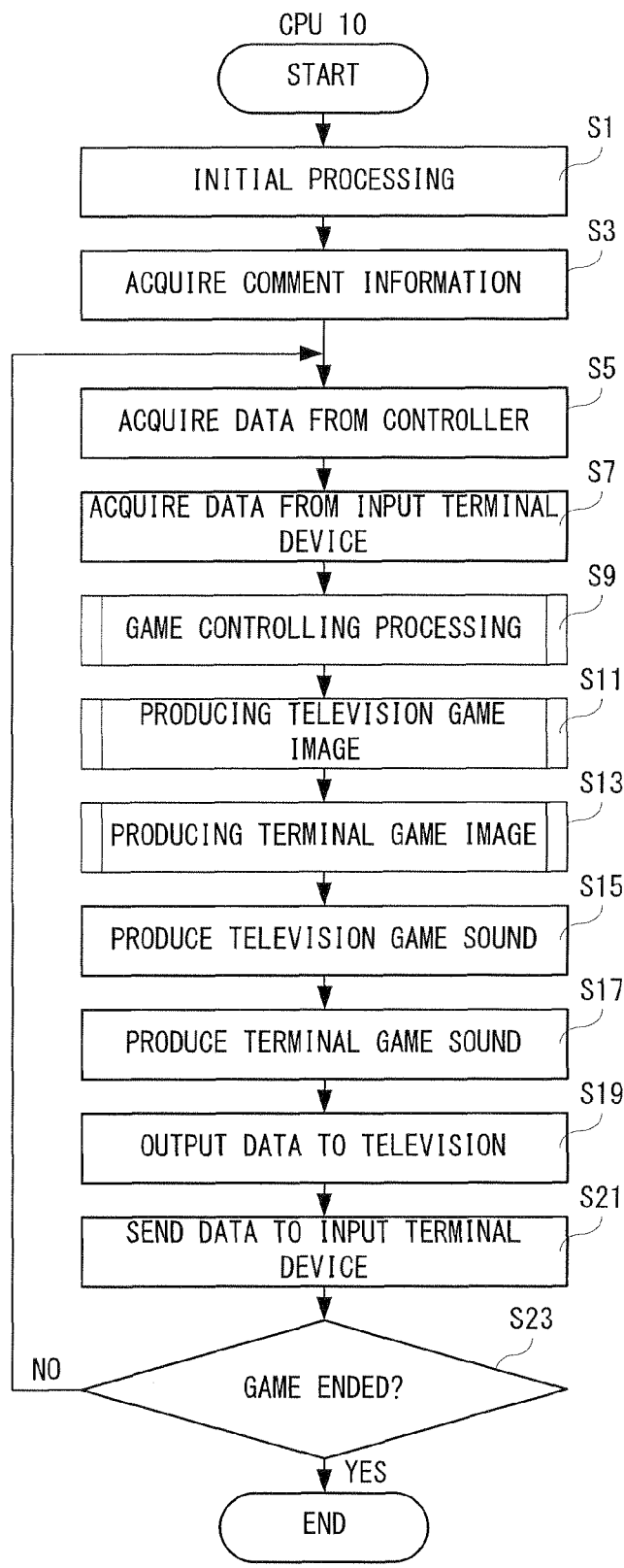
FIG. 13 is a flowchart showing a non-limiting example entire game process of a CPU of the game apparatus shown in FIG. 2.

The main processing program 410 is a program for a process of a main routine of the virtual game (an entire game process of FIG. 13). The image producing program 412 is a program for producing the television game image (100, etc.) and the terminal game image (200, etc.) with using data such as polygon data, texture data, etc.

The image displaying program 414 is a program for displaying image data for the television game image produced according to the image producing program 412 on the television 2. Furthermore, the image displaying program 414 is also a program for sending image data for the terminal game image produced according to the image producing program 412 to the input terminal device 7.

The communication program 416 is a program for performing a communication with a computer (including other game apparatuses) and a server via a network such as Internet.

In addition, the program storage area 402 is also stored with a sound producing program, a sound outputting program, a backing-up program, etc.

The data storage area 404 is stored with receiving data 430, sending data 432, comment information data 434, etc.

The receiving data 430 is various kinds of data received from the controller 5 and the input terminal device 7. The receiving data 430 includes controller operation data 430a and the terminal operation data 430b. In a case that a plurality of controllers 5 are connected to the game apparatus 3, a plural number of controller operation data 430a are stored corresponding to the respective controllers 5. Furthermore, in a case that a plurality of input terminal devices 7 are connected to the game apparatus 3, a plural number of terminal operation data 430b are also stored corresponding to the respective input terminal devices 7.

The controller operation data 430a is data representing an operation by the player with respect to the controller 5, and specifically, data representing an input situation of the operating button. The controller operation data 430a is sent from the controller 5 and acquired by the game apparatus 3, and then, stored in the main memory (11e, 12).

The terminal operation data 430b is data representing an operation by the player with respect to the input terminal device 7, and as described above, includes the operating button data, the stick data and touch position data. In addition, the terminal operation data 430b may be data representing the operation by the player who operates the input terminal device 7, and data including only one of the above-described data. The terminal operation data 430b is sent from the input terminal device 7 and acquired by the game apparatus 3, and then, stored in the main memory (11e, 12).

In addition, in a case that an acceleration sensor and a gyro sensor are provided on the controller 5 and the input terminal device 7, the controller operation data 430a and the terminal operation data 430b may include data (motion data) such as acceleration data, and angular velocity data, etc.

The sending data 432 includes image data 432a and sound data 432b, etc. The image data 432a is produced in a game process (the entire game process of FIG. 13), and includes image data for the terminal game image output by the input terminal device 7, image data for a menu image output by the input terminal device 7 by a menu function, etc. The sound data 432b is produced in the entire game process, and includes sound data for terminal game sound output by the input terminal device 7 and sound data for BGM and sound effects.

The comment information data 434 is data for comment information acquired (downloaded) from the dedicated server. Since the comment is input for each course as described above, there is a case that the comment information data 434 includes data of a plural number of comment information.

Furthermore, the data storage area 404 is provided with a non-displaying flag 436 which is a flag for determining whether or not the designating object 220 and the displaying area 230 are to be non-displayed in the information presenting screen 200. For example, the non-displaying flag 436 is constituted by a 1-bit register. When it is designated that the designating object 220 and the displaying area 230 are to be non-displayed, the non-displaying flag 436 is turned-on and thus, a data value "1" is set in the register. On the other hand, if it is designated that the designating object 220 and the displaying area 230 are to be displayed, the non-displaying flag 436 is turned-off, and thus, a data value "0" is set in the register. In performing the selection of the course, as an initial value, a data value "0" is set in the register.

Although not shown, the data storage area 404 is stored with other data used in the entire game process (FIG. 13) described later, and provided with other flags and counters (timers). In addition, the other data used in the entire game process includes various kinds of data used in the game process such as data representing various kinds of parameters set for various kinds of characters or objects appearing in the virtual game. Furthermore, image data for the television game image and sound data for the television game sound are also included in the data storage area 404.

Figure 12:
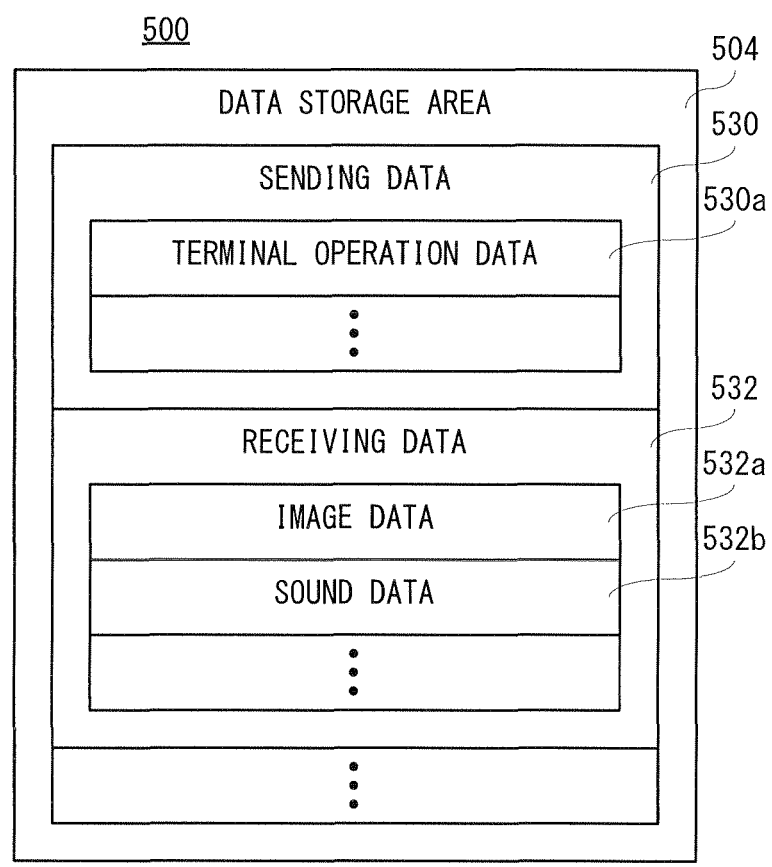
FIG. 12 is a view showing a non-limiting example memory map of an internal memory shown in FIG. 3.

FIG. 12 shows an example of a memory map 500 of the internal memory 98 of the input terminal device 7 shown in FIG. 3. As shown in FIG. 12, the internal memory 98 includes a data storage area 504.

The data storage area 504 is stored with sending data 530, receiving data 532, etc.

The sending data 530 includes terminal operation data 530*a*. Since the terminal operation data 530*a* has the same content as that of the terminal operation data 430*b* included in the above-described receiving data 430, a duplicate description is omitted.

Similarly, the receiving data 532 includes image data 532*a*, sound data 532*b*, etc. These data have the same contents as those of the image data 432*a*, sound data 432*b*, etc. included in the above-described sending data 432, and therefore, a duplicate description is omitted.

FIG. 13 is a flowchart for an entire game process by the CPU 10 provided in the game apparatus 3 shown in FIG. 2. In addition, the processing in respective steps of the flowchart shown in FIG. 13 are only examples, and therefore, as far as the same or similar results are obtained, a processing order of the respective steps may be exchanged. This is true for FIG. 14 to FIG. 18 described later. Furthermore, values of variables and threshold values utilized in the determining steps are also only examples, if necessary, other values may be adopted. Furthermore, this embodiment is described on an assumption that the processing of the respective steps in flowcharts shown in FIG. 13 to FIG. 18 are basically performed by the CPU 10; however, a part of the steps may be performed by a processor (s) and a dedicated circuit(s) other than the CPU 10.

If the power of the game apparatus 3 is turned-on, prior to execution of the entire game process, the CPU 10 executes an activating program stored in a boot ROM not shown, whereby respective units such as the main memory (11*e*, 12), etc. can be initialized. Then, the game program 410 stored in the optical disk 4 is read in the main memory (11*e*, 12), thereby to start an execution of the game program 410 by the CPU 10.

When the entire game process is started, the CPU 10 performs initial processing which is processing for building-up a virtual game space, arranging respective objects appearing the game space at their initial positions, and setting initial values of various kinds of parameters used in the entire game process.

Subsequently, the CPU 10 acquires comment information in a step S3. More specifically, the CPU 10 accesses the dedicated server connected to Internet by connecting Internet via the wireless communication module 18 and the antenna 22 so as to download the comment information from the dedicated server.

Next, in a step S5, the CPU 10 acquires data from the controller 5. More specifically, the CPU 10 receives the controller operation data 430*a* sent from the controller 5 via the antenna 23 and the controller communication module 19 by controlling the input-output processor 11*a* to store the controller operation data 430*a* in the data storage area 404 of the main memory (11*e*, 12).

Subsequently, the CPU 10 acquires various kinds of data sent from the input terminal device 7 in a step S7. More specifically, the CPU 10 controls the input-output processor 11*a* to receive the terminal operation data 430*b* sent from the input terminal device 7 via the antenna 23 and the controller communication module 19, thereby to store the terminal operation data 430*b* in the data storage area 404 in the main memory (11*e*, 12). At this time, the image data and the sound data included in the terminal operation data 430*b* are sent to the codec LSI 27 from the terminal communication module 28 to be subjected to expansion processing by the codec LSI 27 and then output to the input-output processor 11*a*.

Then, in a step S9, game controlling processing (see FIG. 14 and FIG. 15) described later is performed. In a next step S11, as described later in detail, the CPU 10 and the GPU 11*b* perform producing processing (see FIG. 17) of the television game image for displaying on the television 2. Briefly described, the CPU 10 and the GPU 11*b* read data representative of a result of the game controlling processing in the step S9 from the main memory (11*e*, 12), and read data necessary for producing the game image from the VRAM 11*d* so as to produce the television game image.

In a next step S13, as described later in detail, the CPU 10 and the GPU 11*b* perform producing processing (see FIG. 18) of the terminal game image for displaying on the input terminal device 7. Briefly described, as similar to the above-described television game image, the terminal game image is also produced by reading data representative of a result of the game controlling processing in the step S9 from the main memory (11*e*, 12), and reading data necessary for producing the game image from the VRAM 11*d*.

However, if the looking-around is designated, and thus as described above, a screen of the same content as that of the information presenting screen 200 is displayed on the television 2, the processing of the above-described step S11 or S13 may be skipped. Furthermore, in this embodiment, during the play in the course, the television game image and the terminal game image are the same, and therefore, the above-described step S11 or S13 may be skipped. This is true for a case that the course selecting screen 100 is to be displayed on both of the television 2 and the LCD 51 of the input terminal device 7 during the selection of the course.

Subsequently, in a step S15, the CPU 10 produces the television game sound for outputting to the speaker 2*a* of the television 2. That is, the CPU 10 causes the DSP 11*c* to produce a game sound according to the result of the game controlling processing in the step S9.

The CPU 10 produces the terminal game sound for outputting to the speaker 87 of the input terminal device 7 in a step S17. That is, the CPU 10 causes the DSP 11c to produce a game sound according to the result of the game controlling processing in the step S9.

However, if the television game sound and the terminal game sound are coincident with each other, the processing in the step S15 or S17 may not be performed.

Subsequently, in a step S19, the CPU 10 outputs the game image and the game sound to the television 2. Specifically, the CPU 10 sends to the AV-IC 15 the image data for the television game image produced (drawn) in the step S11 and the sound data for the television game sound produced by the DSP 11c in the step S15.

Next, in a step S21, the CPU 10 sends the game image and the game sound to the input terminal device 7. Specifically, the image data for the terminal game image produced (drawn) in the step S13 and the sound data for the terminal game sound produced by the DSP 11c in the step S17 are sent to the codec LSI 27 by the CPU 10 so as to be subjected to the predetermined compression processing by the codec LSI 27. Then, data of the image and the sound subjected to the compression processing is sent to the input terminal device 7 by the terminal communication module 28 via the antenna 29. The input terminal device 7 receives the data of the image and the sound sent from the game apparatus 3 by the wireless module 90, whereby the predetermined expansion processing is performed on the data of the image and the sound by the codec LSI 86. The image data being performed with the expansion processing is output to the LCD 51 and the sound data being performed with the expansion processing is output to the sound IC 88.

Then, in a step S23, the CPU 10 determines whether or not the game is to be ended. Determination in the step S23 is performed by determining whether or not the game is made over or whether or not the player inputs an instruction to stop the game, for example. The determination on whether or not the game is made over is performed by determining the remaining vital value of the player character 104 (204) becomes zero (0), for example.

If "NO" is determined in the step S23, that is, if the game is not to be ended, the process returns to the step S5. On the other hand, if "YES" is determined in the step S23, that is, if the game is to be ended, the entire game process is terminated.

In addition, in this embodiment, the comment information is acquired at the beginning of the start of the entire game process, but the comment information may be acquired in a processing loop in the steps S5 to S23.

Figure 14:
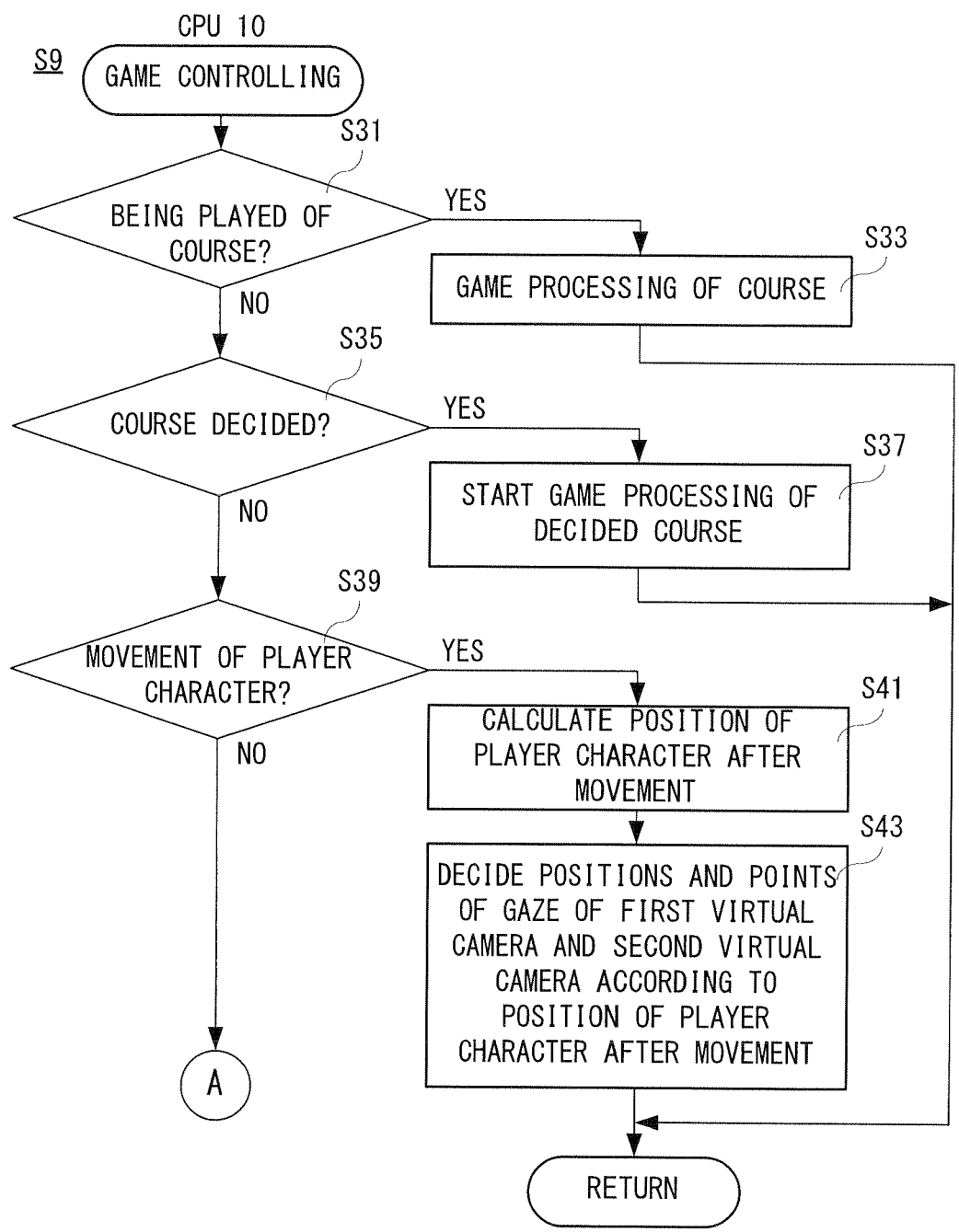
FIG. 14 is a flowchart showing a non-limiting example part of game control processing by the CPU of the game apparatus shown in FIG. 2.
Figure 15:
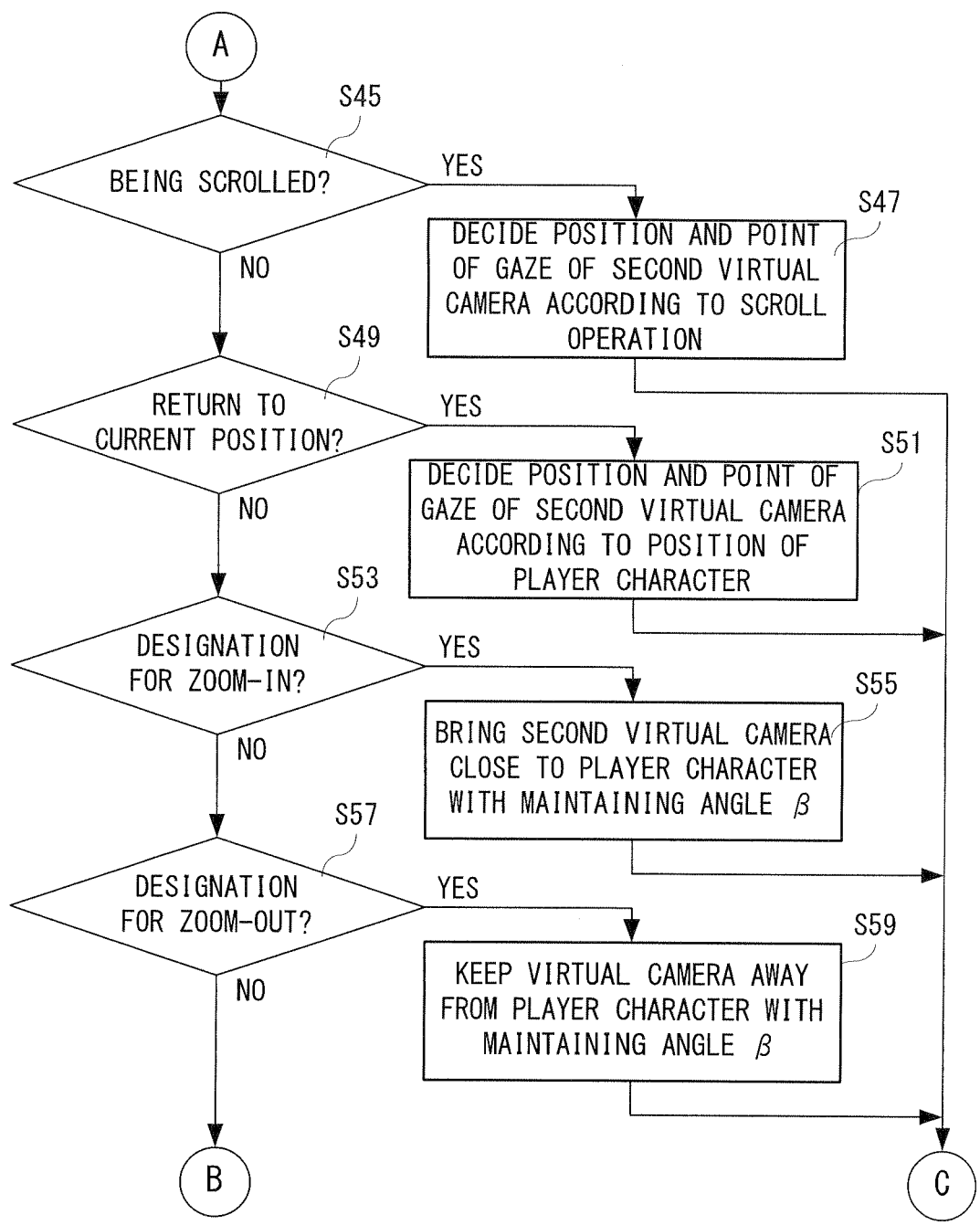
FIG. 15 is a flowchart showing a non-limiting example further part of the game control processing by the CPU of the game apparatus shown in FIG. 2, following FIG. 14.

FIG. 14 and FIG. 15 show a flowchart of the game controlling processing in the step S9 shown in FIG. 13. As shown in FIG. 14, if the game controlling processing is started, the CPU 10 determines whether or not the course is being played in a step S31. If "YES" is determined in the step S31, that is, if a given course is being played, in a step S33, the CPU 10 performs the game processing for the course, and then, the process returns to the entire game process.

Although a detailed description is omitted here, in the game processing for the course, through the operation by the player using the controller 5, the player character 104 moves in the course or performs an arbitrary action. Then, the enemy character moves, the background object is changed or disappears. Furthermore, the goal (course clear) judgement or the mistake judgement is performed. If the course is cleared or a mistake occurs, a screen for inputting a comment is displayed, whereby the player can input an arbitrary comment. If the input of the comment is ended, the comment information including the identification information of the course, input comment (text information) and the information of the avatar of the player is sent to the dedicated server.

On the other hand, if "NO" is determined in the step S31, that is, if the course is not being played, in a step S35, it is determined whether or not the course has been decided. Here, the CPU 10 determines whether or not the 2 button of the controller 5 is operated in a state that the player character 104 is positioned on the course mark 102a. In addition, determination on whether or not the 2 button of the controller 5 is operated is performed by referring to the controller operation data 430a included in the receiving data 430.

If "YES" is determined in the step S35, that is, if the course has been decided, in a step S37, the game processing for the decided course is started, and then, the process returns to the entire game process. On the hand, if "NO" is determined in the step S35, that is, if the course is not decided, in a step S39, it is determined whether or not the player character 104 (204) is to be moved. Here, the CPU 10 determines whether or not the cross button is operated by referring to the controller operation data 430a and determines whether or not the player character can be moved in the operated (designated) direction.

If "YES" is determined in the step S39, that is, if the player character 104 (204) is to be moved, in a step S41, a position P of the player character 104 (204) after movement is calculated (set), and in a step S43, positions and points of gaze of the first virtual camera C1 and the second virtual camera C2 are decided (calculated) on the basis of the position P of the player character 104 (204) after movement, and then, the process returns to the entire game process. That is, in response to that the position P (designating position) of the player character 104 (204) is set, in a step S43, displaying ranges in the virtual space are decided for the first virtual camera C1 (course selecting screen 100) and the second virtual camera C2 (information presenting screen 200), respectively.

In addition, a deciding method of the position and the point of gaze of each of the first virtual camera C1 and the second virtual camera C2 is as described above.

On the other hand, if "NO" is determined in the step S39, that is, if the player character 104 (204) is not to be moved, in a step S45 shown in FIG. 15, it is determined whether or not a scroll is designated. Here, the CPU 10 determines, with referring to the terminal operation data 430b, whether or not the slide operation is performed on the touch panel 52, the analog stick 53 is operated, or the cross button is operated on the input terminal device 7.

Figure 16:
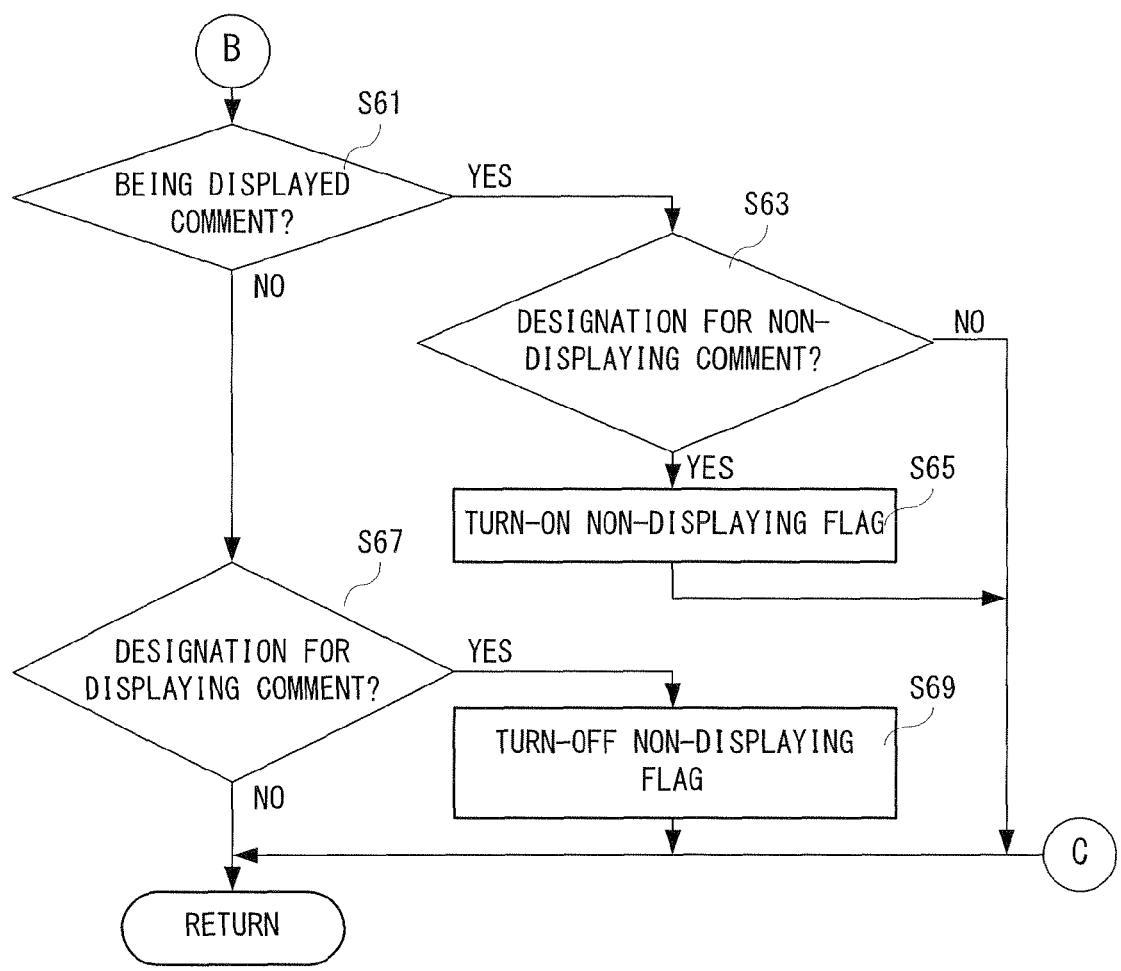
FIG. 16 is a flowchart showing a non-limiting example still further part of the game control processing by the CPU of the game apparatus shown in FIG. 2, following FIG. 15.

If "YES" is determined in the step S45, that is, if the scroll is designated, in a step S47, the position and the point of gaze of the second virtual camera C2 are decided according to the slide operation or the like, and the process returns to the entire game process as shown in FIG. 16. In a step S47, the CPU 10 calculates the x coordinates and/or the z coordinates of the second virtual camera C2 according to the slide operation. At this time, the direction of the second virtual camera C2 is kept to be fixed. Therefore, the point of gaze can be calculated by changing the x coordinates and/or the z coordinates of the focus position according to the slide operation.

On the other hand, if "NO" is determined in the step S45, that is, if no scroll is designated, in a step S49, it is determined whether or not it is necessary to return to the current position. Here, the CPU 10 determines, with referring to the terminal operation data 430b, whether or not the A button is operated or the icon 212 is touched on the input terminal device 7 in a case that the icon 212 is being displayed on the LCD 51.

If "YES" is determined in the step S49, that is, if it is necessary to return to the current position, in a step S51, the position and the point of gaze of the second virtual camera C2 are decided according to the position P of the player character 204, and then, the process returns to the entire game process. More specifically, in the step S51, the CPU 10 sets the position of the second virtual camera C2 such that the position has a predetermined relationship with the focus position that the y coordinates of the position P of the player character 204 is made zero (0), and sets the point of gaze of the second virtual camera C2 to the focus position.

On the other hand, if "NO" is determined in the step S49, that is, if it is not necessary to return to the current position, in a step S53, it is determined whether or not the zooming-in is designated. Here, the CPU 10 determines, with referring to the terminal operation data 430b, whether or not the + button of the input terminal device 7 is operated or whether or not the icon 208 is touched.

If "YES" is determined in the step S53, that is, if the designation of the zooming-in is input, in a step S55, the CPU 10 adjusts the distance d2 and the height h2 so as to bring the second virtual camera C2 close to the player character 104 (204) with a predetermined speed while the angle beta (β) shown in FIG. 5 is maintained, and then, the process returns to the entire game process. In addition, in a case that the second virtual camera C2 is zoomed-in at maximum, the processing in the step S55 is skipped.

If "NO" is determined in the step S53, that is, if the designation for zooming-in is not input, in a step S57, it is determined whether or not the zooming-out is designated. Here, the CPU 10 determines, with referring to the terminal operation data 430b, whether or not the − button of the input terminal device 7 is operated or the icon 206 is touched.

If "YES" is determined in the step S57, that is, if the zooming-out is designated, in a step S59, the distance d2 and the height h2 are adjusted such that the player character 104 (204) is kept away from the second virtual camera C2 with a predetermined speed while the angle beta (β) shown in FIG. 5 is maintained, and then, the process returns to the entire game process. In addition, in a case that the second virtual camera C2 is zoomed-out at maximum, the processing in the step S59 is skipped.

On the other hand, if "NO" is determined in the step S57, that is, if the designation for the zooming-out is no input, in a step S61 shown in FIG. 16, it is determined whether or not the comment is being displayed. Here, the CPU 10 determines whether or not the non-displaying flag 436 is turned-off. If "YES" is determined in the step S61, that is, if the comment is being displayed, it is determined whether or not the designation for non-displaying the comment exists in a step S63. Here, the CPU 10 determines whether or not the B button of the input terminal device 7 is operated. In addition, the CPU 10 determines whether or not the B button of the input terminal device 7 is operated with referring to the terminal operation data 430b. This is true for a step S67 described later.

If "YES" is determined in the step S63, that is, if the designation for non-displaying the comment exists, in a step S65, the non-displaying flag 436 is turned-on, and the process returns to the entire game process. If "NO" is determined in the step S63, that is, if the designation for non-displaying the comment does not exist, the process returns to the entire game process with no operation.

If "NO" is determined in the step S61, that is, if the comment is not being displayed, in a step S67, it is determined whether or not the designation for displaying the comment exists. Here, the CPU 10 determines whether or not the B button of the input terminal device 7 is operated. If "YES" is determined in the step S67, that is, if the designation for displaying the comment exists, in a step S69, the non-displaying flag 436 is turned-off, and then, the process returns to the entire game process. If "NO" is determined in the step S67, that is, if the designation for displaying the comment does not exist, the process returns to the entire game process with no operation.

In addition, although omitted in FIG. 14 and FIG. 15, in a case that the + button, the 1 button or the A button of the controller 5 is operated, as described above, by the producing processing (S11) of the television game image thereafter, on the television 2, the menu screen is displayed or the item screen is displayed or the screen having the same content as that of the information presenting screen 200 is displayed.

Figure 17:
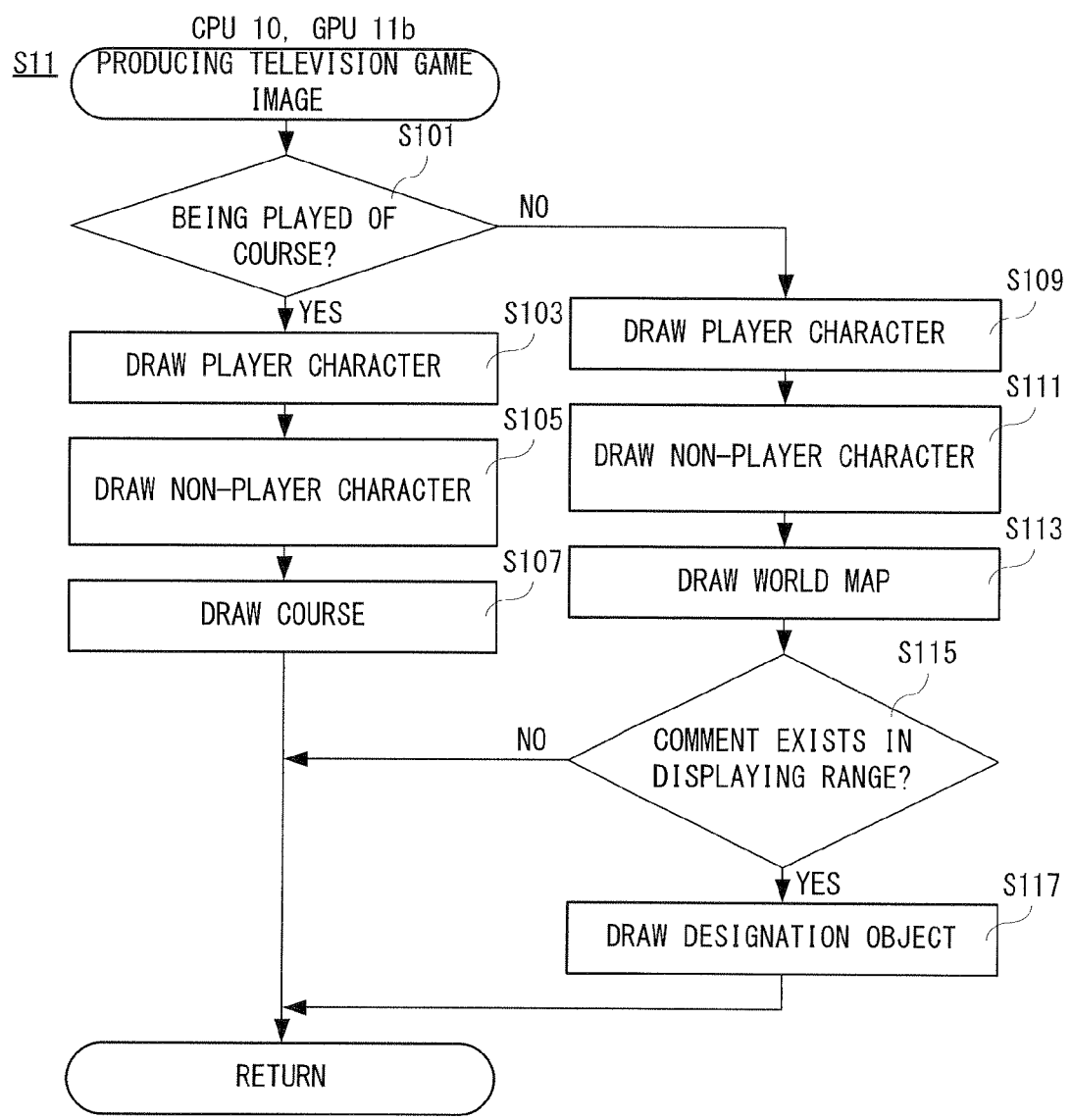
FIG. 17 is a flowchart showing a non-limiting example television game image producing processing by the CPU and the GPU of the game apparatus shown in FIG. 2.

FIG. 17 is a flowchart of the producing processing of the television game image in the step S11 shown in FIG. 13. In the television game image producing processing, a three-dimensional CG image for the virtual space viewed from the first virtual camera C1 which is arranged within the virtual space is produced. As shown in FIG. 17, when the producing processing is started, the CPU 10 determines whether or not the course is being played in a step S101. If "YES" is determined in the step S101, that is, if a given course is being played, in a step S103 the player character in the course corresponding to the player character 104 in the course selecting screen 100 is drawn, and in a step S105, the non-player characters such as the enemy character, item character, etc. in the course are drawn, and in a step S107, the background, block object, pipe object, etc. in the course are depicted or drawn, and then, the process returns to the entire game process.

If "NO" is determined in the step S101, that is, if the no course is being played, the CPU 10 and the GPU 11b draw the player character 104 at the current position P in a step S109, draw the non-player character at a predetermined position in a step S111, and draw the world map 102 including the background, the course mark 102a, the route image 102b, the castle object 102c, etc. in a step S113.

Then, in a step S115, it is determined whether or not the comment exists within the displaying range. Here, the CPU 10 determines whether or not the data for the comment information including the identification information of the course corresponding to the course mark 102a included in the imaging range of the first virtual camera C1 is included in the comment information data 434.

If "NO" is determined in the step S115, that is, if no comment exists in the displaying range, the process returns to the entire game process with no operation. On the other hand, if "YES" is determined in the step S115, that is, if there is the comment within the displaying range, the designating object 120 is drawn in a step S117, and then, the process returns to the entire game process. However, according to the above-described comment displaying process, the designating object (102a, 202a) and the displaying area 230 (comment) are displayed in the virtual space and in the course selecting screen 100, the displaying area 230 is not displayed, and accordingly, only the designating object 120 is drawn in the step S117.

Figure 18:
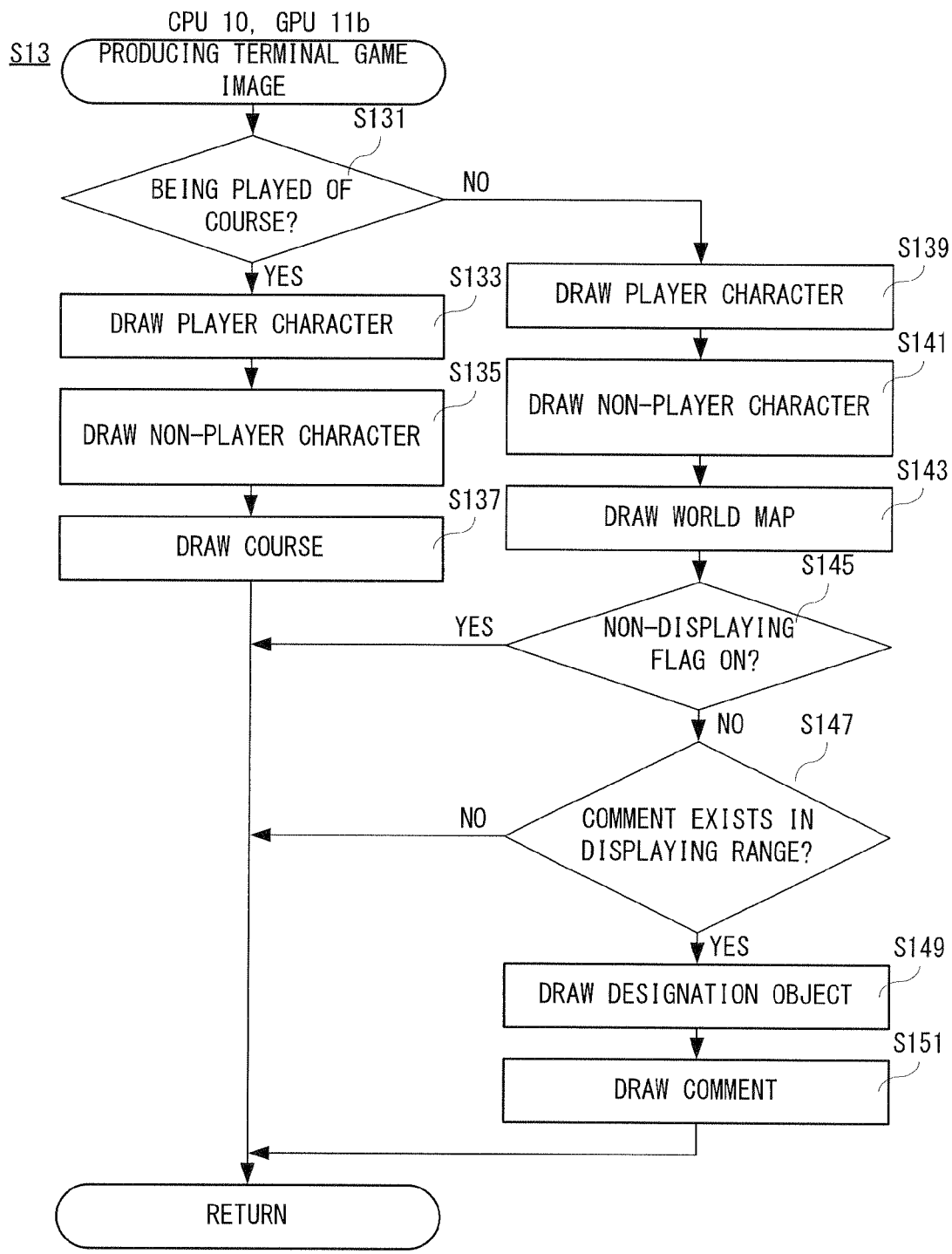
FIG. 18 is a flowchart showing a non-limiting example terminal game image producing processing by the CPU and the GPU of the game apparatus shown in FIG. 2.

FIG. 18 is a flowchart of the producing processing of the terminal game image in the step S13 shown in FIG. 13. In the terminal game image producing processing, a three-dimensional CG image for the virtual space viewed from the second virtual camera C2 which is arranged within the virtual space is produced. As shown in FIG. 18, when the producing processing is started, the CPU 10 determines whether or not the course is being played in a step S131. If "YES" is determined in the step S131, that is, if a given course is being played, the CPU 10 and the GPU 11b draw the player character in the course corresponding to the player character 104 in the course selecting screen 100 in a step S133, draw the non-player objects such as the enemy character, item character, etc. in the course in a step S135 and draw the background, the block object, the pipe object, etc. in the course in the step S137, and then, the process returns to the entire game process.

On the other hand, if "NO" is determined in the step S131, that is, if the course is not being played, the CPU 10 and the GPU 11*b* draw the player character 204 at the current position P in a step S139, draw the non-player character at a predetermined position in a step S141 and draw the world map 202 including the background, the course mark 202*a*, the route image 202*b*, the castle object 202*c*, etc. in a step S143.

Then, in a step S145, it is determined whether or not the non-displaying flag 436 is turned-on. If "YES" is determined in the step S145, that is, if the non-displaying flag 436 is turned-on, the process returns to the entire game process with no operation. Therefore, in the input terminal device 7, the information presenting screen 200 wherein the designating object 220 and the displaying area 230 are not displayed is displayed on the LCD 51 as shown in FIG. 10.

On the other hand, if "NO" is determined in the step S145, that is, if the non-displaying flag 436 is turned-off, in a step S147, it is determined whether or not the comment exists in the displaying range. Here, the CPU 10 determines whether or not the data for the comment information including the identification information of the course corresponding to the course mark 202*a* included in the imaging range of the second virtual camera C2 is included in the comment information data 434.

If "NO" is determined in the step S147, that is, if no comment exists within the displaying range, the process returns to the entire game process with no operation. On the other hand, if "YES" is determined in the step S147, that is, if the comment exists within the displaying range, the designating object 220 is drawn in a step S149 and the comment is drawn in a step S151, and then, the process returns to the entire game process. However, according to the above-described comment displaying processing, the designating object (102*a*, 202*a*) and the displaying area 230 (comment) are displayed in the virtual space and in a case that the non-displaying flag 436 is turned-off, in the information presenting screen 200, the designating object 220 and the displaying area 230 are drawn because the displaying area 230 is also displayed. Therefore, in the input terminal device 7, the information presenting screen 200 as shown in FIG. 4(B), FIG. 7(B), FIG. 8 and FIG. 9 such that the designating object 220 and the displaying area 230 are displayed are displayed on the LCD 51.

According to this embodiment shown, if the course is to be selected, the information presenting screen for the detailed world map including the comment of another player is displayed on the LCD of the input terminal device kept at hand of the player, and the course selecting screen for the world map that the comment is not displayed but the designating object indicating the presence of the comment is included is displayed on the television, accordingly the user or player can obtain the information while seeing the screen at hand and easily select a desired course while seeing the television screen.

In addition, in this embodiment, in the information presenting screen, the comment displaying area is displayed to pop up from the designating object, but only the comment displaying area may be displayed while the designating object is not displayed. In such a case, the designating object is displayed in the course selecting screen, and the comment displaying area is displayed at a corresponding position on the information presenting screen. Therefore, it can also be said that the designating object is an image that the comment is abstracted. Then, in this case, in the information presenting screen, the displaying area (comment) is displayed as the entity of the designating object.

Furthermore, since the same face image as the face image adhered to the designating object is displayed in the displaying area, it is not necessary to display the displaying area to pop up from the designating object, and the displaying area may be correctively displayed on an end of the information presenting screen (left end or right end, for example).

Furthermore, in this embodiment, in order to avoid that the course mark becomes invisible, the designating object and the comment displaying area are displayed in the vicinity of the course mark, but not limited to such an arrangement. For example, the designating object and the comment displaying area may be displayed on the course mark. In this case, it is possible to make the course mark visible by displaying the designating object and the comment displaying area in a semi-transparent manner.

Furthermore, in this embodiment, the comment of another player downloaded from the dedicated server is displayed, but not limited to such a situation. For example, the comment input by the player his/herself playing with a game apparatus may be further displayed, or only the comment input by the player his/herself playing with the game apparatus may be displayed. In the former case, the comment information is downloaded from the dedicated server regardless of the player who inputs the comment. In the latter case, only the comment information for the comment of the player his/herself is downloaded from the dedicated server and the comment is displayed with using the downloaded comment information, or by not providing the dedicated server, the comment may be displayed with using the comment information previously stored in the game apparatus. Furthermore, only the comment information for the comment of another player being registered in advance is downloaded, and the comment may be displayed with using the downloaded comment information.

Furthermore, the game system shown in this embodiment is only an example, and other structure may be adopted as far as the displaying portion of the course selecting screen and the displaying portion of the information presenting screen are provided. As an example for achieving a game system shown in this embodiment, a general-purpose personal computer (PC) is provided instead of the game apparatus and a tablet computer is provided instead of the input terminal device, and then, the PC and the tablet computer are connected to each other in a communication-capable manner, and the course selecting screen is displayed on the displaying portion uniformly provided with the PC or the displaying portion connected to the PC, and the information presenting screen is displayed on the displaying portion uniformly provided with the tablet computer. In this case, an input device of the PC functions as a controller.

Furthermore, the game apparatus shown in this embodiment is connected to the controller and the input terminal device in a communication-capable manner by utilizing a near field wireless communication such as Bluetooth (registered trademark); however, may be connected in a communication-capable manner via the network. Furthermore, the game apparatus may be a single system where a plurality of devices each of which takes charge of one, two or more out of the respective processings such as the communication processing, image processing, game controlling processing, etc. are connected with each other in a communication-capable manner.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-described ASICs (application specific integrated circuits) and/or logic circuitry. In the case of a distributed processor architecture of arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory readable storage medium storing an information processing program executable by a computer of an information processing apparatus which displays, based on an input from an input device, a virtual space on a portable-type display device and a stationary-type display device, wherein the information processing program causes the computer to function as:
   an input acquiring portion which acquires an input from the input device;
   a position setting portion which sets a designating position within the virtual space based on the input acquired by the input acquiring portion;
   a first displaying portion which displays the virtual space on the stationary-type display device based on the designating position set by the position setting portion; and
   a second displaying portion which displays at least a part of the virtual space displayed on the stationary-type display device by the first displaying portion on the portable-type display device based on the designating position set by the position setting portion, wherein
   the first displaying portion displays an object representing presence of the predetermined information if and when predetermined information is included within a displaying range of the stationary-type display device, and
   the second displaying portion displays an entity of the predetermined information if and when the predetermined information is included within a displaying range of the portable-type display device.

2. A non-transitory computer readable storage medium according to claim 1, wherein the predetermined information is information associated with a predetermined position within the virtual space.

3. A non-transitory computer readable storage medium according to claim 2, wherein the predetermined information includes at least text information associated with the predetermined position.

4. A non-transitory computer readable storage medium according to claim 2, wherein the predetermined information includes at least image information associated with the predetermined position.

5. A non-transitory computer readable storage medium according to claim 2, wherein the predetermined information is information input by another user.

6. A non-transitory computer readable storage medium according to claim 5, wherein the object includes an image associated with another user.

7. A non-transitory computer readable storage medium according to claim 2, wherein the predetermined information is acquired from a network.

8. A non-transitory computer readable storage medium according to claim 2, wherein the predetermined information is displayed at a predetermined position with which the predetermined information is associated or near the predetermined position.

9. A non-transitory computer readable storage medium according to claim 1, wherein the second displaying portion further displays an object representing presence of the predetermined information included in the displaying range of the portable-type display device.

10. A non-transitory computer readable storage medium according to claim 1, wherein the second displaying portion makes the entity of the predetermined information displayed or non-displayed in response to that the predetermined input is acquired by the input acquiring portion.

11. A non-transitory computer readable storage medium according to claim 1, wherein the displaying range of the portable-type display device is wider than the displaying range of the stationary-type display device.

12. An information processing apparatus which displays, based on an input from an input device, a virtual space on a portable-type display device and a stationary-type display device, comprising a processor system, including a processor, the processor system being configured to:
   acquire an input from the input device;
   set a designating position within the virtual space based on the acquired input;
   display the virtual space on the stationary-type display device based on the set designating position; and
   display at least a part of the virtual space displayed on the stationary-type display device on the portable-type display device based on the set designating position, wherein
   display an object representing presence of the predetermined information on the stationary-type display device if and when predetermined information is included within a displaying range of the stationary-type display device, and
   display an entity of the predetermined information on the portable-type display device if and when the predetermined information is included within a displaying range of the portable-type display device.

13. An information processing system which displays, based on an input from an input device, a virtual space on a portable-type display device and a stationary-type display device, comprising:
an input acquiring portion which acquires an input from the input device;
a position setting portion which sets a designating position within the virtual space based on the input acquired by the input acquiring portion;
a first displaying portion which displays the virtual space on the stationary-type display device based on the designating position set by the position setting portion; and
a second displaying portion which displays at least a part of the virtual space displayed on the stationary-type display device by the first displaying portion on the portable-type display device based on the designating position set by the position setting portion, wherein
the first displaying portion displays an object representing presence of the predetermined information if and when predetermined information is included within a displaying range of the stationary-type display device, and
the second displaying portion displays an entity of the predetermined information if and when the predetermined information is included within a displaying range of the portable-type display device.

14. An information processing method of a computer which displays, based on an input from an input device, a virtual space on a portable-type display device and a stationary-type display device, the computer performing steps of:
(a) acquiring an input from the input device;
(b) setting a designating position within the virtual space based on the input acquired in the step (a);
(c) displaying the virtual space on the stationary-type display device based on the designating position set in the step (b); and
(d) displaying at least a part of the virtual space displayed on the stationary-type display device in the step (c) on the portable-type display device based on the designating position set in the step (b), wherein an object representing presence of the predetermined information is displayed in the step (c) if and when predetermined information is included within a displaying range of the stationary-type display device, and
an entity of the predetermined information is displayed in the step (d) if and when the predetermined information is included within a displaying range of the portable-type display device.

15. The non-transitory readable storage medium according to claim 1, wherein the first displaying portion further displays at least one player character and at least one non-player character.

16. The information processing apparatus according to claim 12, wherein the processor system is further configured to display at least one player character and at least one non-player character on the stationary-type display device.

17. The information processing system according to claim 13, wherein the first displaying portion further displays at least one player character and at least one non-player character.

18. The information processing method according to claim 14, wherein at least one player character and at least one non-player character are displayed in the step (c).

19. The information processing apparatus according to claim 12, wherein the processor system is further configured to display an object on the portable-type display device representing presence of the predetermined information included in the displaying range of the portable-type display device.

20. The information processing system according to claim 13, wherein the second displaying portion further displays an object representing presence of the predetermined information included in the displaying range of the portable-type display device.

21. The information processing method according to claim 14, wherein an object representing presence of the predetermined information included in the displaying range of the portable-type display device is displayed in the step (d).

* * * * *